United States Patent
Yoshida

(10) Patent No.: US 9,160,887 B2
(45) Date of Patent: Oct. 13, 2015

(54) PRINTING MEDIUM, INFORMATION PROCESSING METHOD, INFORMATION PROCESSING DEVICE

(76) Inventor: Kenji Yoshida, Tokyo (JP)

(*) Notice: Subject to any disclaimer, the term of this patent is extended or adjusted under 35 U.S.C. 154(b) by 76 days.

(21) Appl. No.: 13/509,078

(22) PCT Filed: Nov. 10, 2010

(86) PCT No.: PCT/JP2010/070026
§ 371 (c)(1),
(2), (4) Date: May 10, 2012

(87) PCT Pub. No.: WO2011/059002
PCT Pub. Date: May 19, 2011

(65) Prior Publication Data
US 2012/0224229 A1 Sep. 6, 2012

(30) Foreign Application Priority Data

Nov. 11, 2009 (JP) .................. 2009-258348
Jul. 13, 2010 (JP) .................. 2010-158455

(51) Int. Cl.
*H04N 1/405* (2006.01)
*H04N 1/387* (2006.01)
(Continued)

(52) U.S. Cl.
CPC .............. *H04N 1/405* (2013.01); *G06K 7/1447* (2013.01); *G06K 19/06037* (2013.01);
(Continued)

(58) Field of Classification Search
CPC .......... H04N 2201/0094; H04N 1/405; H04N 1/32144; H04N 2201/3269; G06K 15/1881; G06K 15/027; G06K 2215/101; G06K 15/102; G06K 15/1889; G06K 2215/0094; G06F 3/12
USPC .............. 358/3.28, 1.18, 1.9, 2.1, 3.06–3.08, 358/3.16–3.19, 3.26, 468
See application file for complete search history.

(56) References Cited

U.S. PATENT DOCUMENTS 5,542,031 A * 7/1996 Douglass et al. ............ 358/1.15
5,691,822 A * 11/1997 Jones ............................ 358/3.2
(Continued)

FOREIGN PATENT DOCUMENTS

CN 101263445 A 9/2008
EP 2455894 5/2012
(Continued)

OTHER PUBLICATIONS

International search Report corresponding to International Application No. PCT/JP2010/070026, mailed Mar. 15, 2011, by Japanese Patent Office (English translation provided).
(Continued)

*Primary Examiner* — Thomas D Lee
*Assistant Examiner* — Stephen M Brinich
(74) *Attorney, Agent, or Firm* — Duane Morris LLP

(57) ABSTRACT

A printing medium that is capable of expressing vivid colors without increasing the number of colors and capable of suppressing a printing cost of a dot pattern printing, an information processing method, and an information processing device that use the printing medium are provided that make it possible to perform superposed printing of a graphic and a dot pattern with one color without using inks having different frequency characteristics. A dot pattern includes grid dots arranged in accordance with a predetermined rule for defining information with halftone dots that are superimposed and printed. The printing medium is printed in a way in which dots on the printing medium are detected from brightness information recorded in bitmap image data by a predetermined method and the dots are determined either as the grid dots that constitute the dot pattern or the halftone dots by an image analysis processing unit.

21 Claims, 14 Drawing Sheets

(51) Int. Cl.
*G06K 19/06* (2006.01)
*G06K 7/14* (2006.01)
*H04N 1/32* (2006.01)

(52) U.S. Cl.
CPC ..... *G06K 19/06046* (2013.01); *H04N 1/32208* (2013.01); *H04N 1/32256* (2013.01); *H04N 1/32309* (2013.01); *H04N 1/3871* (2013.01)

(56) References Cited

U.S. PATENT DOCUMENTS

| | | | |
|---|---|---|---|
| 5,715,335 | A | 2/1998 | De Haan et al. |
| 6,044,179 | A | 3/2000 | Savakis |
| 6,104,812 | A | 8/2000 | Koltai et al. |
| 6,628,833 | B1 | 9/2003 | Horie |
| 6,687,021 | B1 * | 2/2004 | Kerz ............ 358/1.9 |
| 8,189,237 | B2 * | 5/2012 | McElvain ........ 358/3.1 |
| 2004/0020989 | A1 | 2/2004 | Muramatsu |
| 2008/0088860 | A1 | 4/2008 | Yoshida |
| 2009/0066977 | A1 | 3/2009 | Yoshida |

FOREIGN PATENT DOCUMENTS

| | | |
|---|---|---|
| EP | 1800883 | 3/2014 |
| JP | WO2006-040832 A1 | 4/2006 |
| SG | WO2007/021249 A2 | 2/2007 |
| WO | 2009057314 | 5/2009 |

OTHER PUBLICATIONS

Eurasian Patent Office Official Action dated Mar. 5, 2014 issued in corresponding Appln. No. 201270624/31.

Supplementary Search Report appended in an Office Action for corresponding EP Application No. EP10829961, issued on Jan. 21, 2015.

European Search Opinion dated Jan. 29, 2015 from corresponding EP Application No. 10829961, cf Form 1507, pp. 1-9.

* cited by examiner

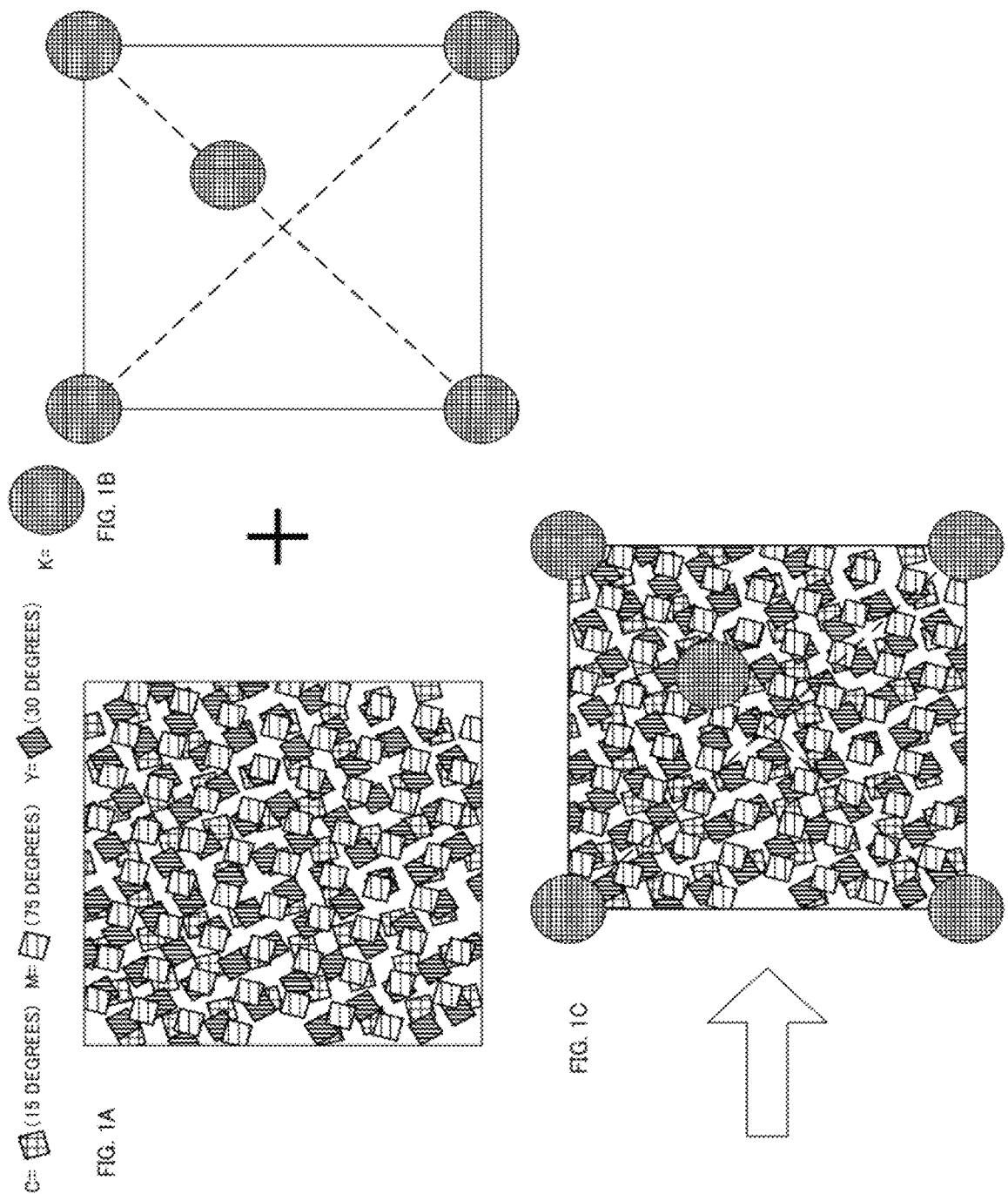

FIG. 2 ONE COLOR
M COLOR GRID DOTS ARE SUPERIMPOSED ON M COLOR HALFTONE DOTS
(C, Y, OR K MAY ALSO BE USED)
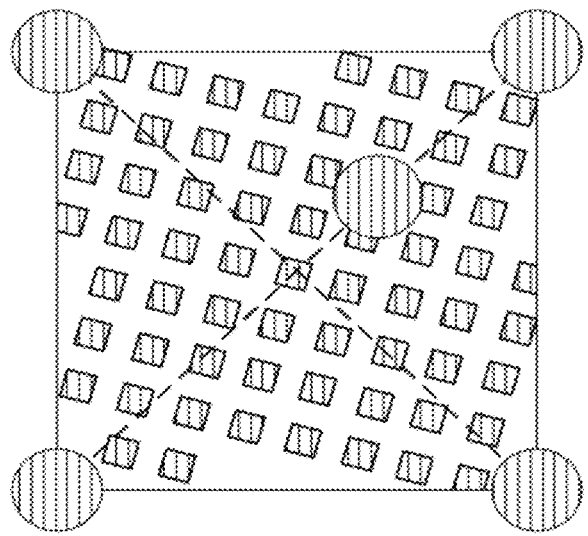
FIG. 3 C, M, Y → INK THAT REFLECTS INFRARED LIGHT
K → CARBON BLACK THAT ABSORBS INFRARED LIGHT
C = ▧ (15 DEGREES)
M = ▱ (75 DEGREES)
Y = ◆ (30 DEGREES)
K (HALFTONE DOT) = ◆ (45 DEGREES)
K (GRID DOT) = ●
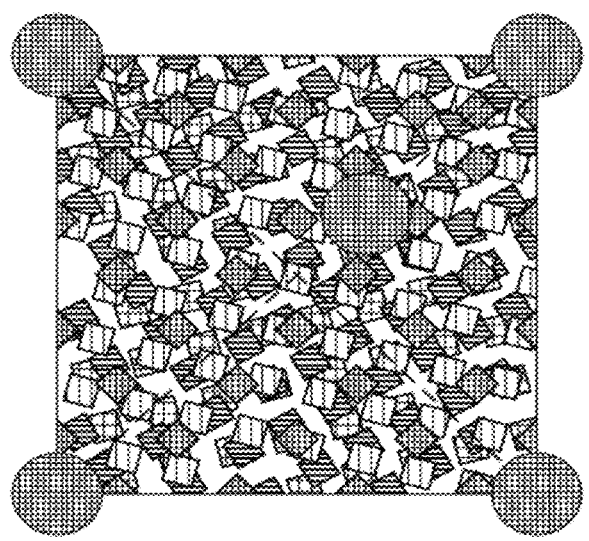

15 PIXELS

8 PIXELS

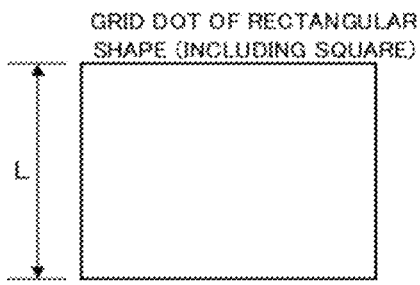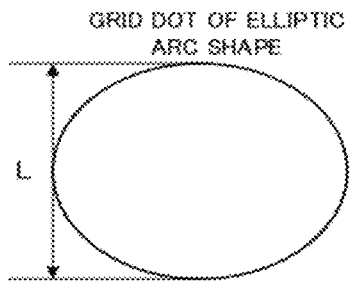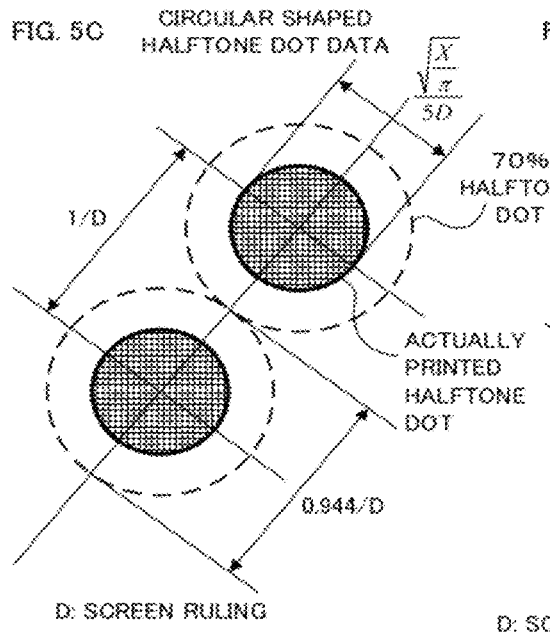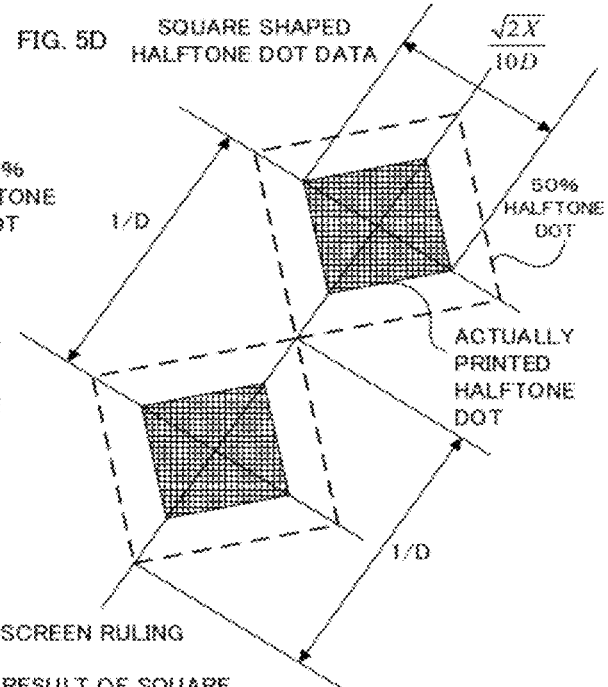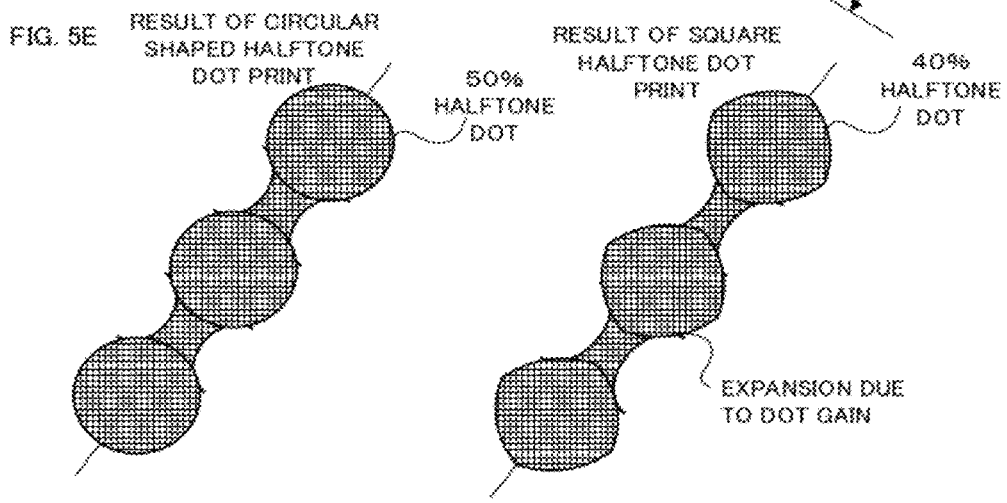

B(1)~B(10)
BRIGHTNESS
MEASURING AREA $$\bar{A} = \frac{\sum B(i)}{n}, n = 10$$

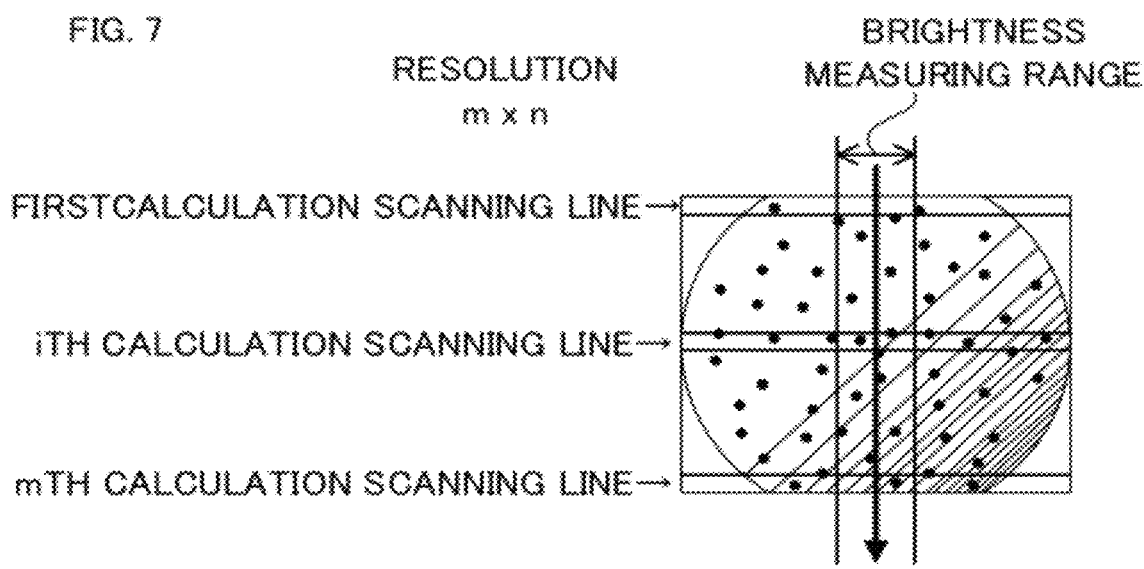

DETERMINED AS DOT

B(i+3) B(i+4) B(i+5) B(i+6) B(i+7) B(i+8)

$\Delta B = |B(i+n) - B(i)| > T, n = 4$

IMAGED BY PERPENDICULARLY STANDING
OPTICAL READING UNIT

IMAGED BY INCLINING OPTICAL READING UNIT
(BY 40 DEGREES)

PRINTING MEDIUM, INFORMATION PROCESSING METHOD, INFORMATION PROCESSING DEVICE

CROSS REFERENCE TO RELATED APPLICATIONS

This application is a national stage entry under 35 U.S.C. §371 of international patent application number PCT/JP2010/070026, which was filed on Nov. 10, 2010 and claims priority to Japanese patent application number JP 2009-258348 filed on Nov. 11, 2009 and to Japanese patent application number JP 2010-158455 filed Jul. 13, 2010, the entireties of which are herein incorporationed by reference.

FIELD OF THE INVENTION

The present invention relates to a printing medium printed with a dot pattern that is superimposed and printed on a halftone dot print and can be read out by being distinguished from the halftone dots by an optical reading unit, and an information processing method and an information processing device for reading the dot pattern using the printing medium.

BACKGROUND OF THE INVENTION

The inventor of the present application has invented many techniques in which a dot pattern on such a medium on which the dot pattern and an image are superimposed and printed is read in order to output information.

Japanese Published Unexamined Patent Application No. 2007-79993 discloses an invention in which a dot pattern and a map are superimposed and printed, and, by reading the dot pattern on the map, information corresponding to the coordinates on the map is output.

Japanese Published Examined Patent Application No. 4042065 discloses an invention in which a dot pattern and a drawing pattern of a keyboard for a personal computer are superimposed and printed, and, by reading the dot pattern on a key of the keyboard, an input instruction corresponding to the key is performed to the personal computer.

WO2004/029871 discloses a method of reading only a dot pattern by an optical reading unit when reading an area on which an image and the dot pattern is superimposed and printed. According to WO2004/029871, in order to read only a dot pattern, the image is printed with a non-carbon ink and the dot pattern is printed with a transparent or translucent infrared absorbing ink or carbon black. As the carbon black (black ink) has a characteristic of absorbing infrared light, the optical reading unit irradiates infrared light and only the infrared light reflected off the medium surface is captured to read the dot pattern. Thus, five colors are used for color printing.

On the other hand, according to WO2007/021249, to save a printing cost, four color printing can be performed using the same inks as the conventional techniques by expressing pseudo black color using CMY non-carbon inks (what is called composite black) instead of using non-carbon K (black) ink.

SUMMARY OF THE INVENTION

Problems that the Invention is to Solve

According to WO2004/029871, there was a problematic point in which, CMYK non-carbon inks for images and an invisible infrared absorbing ink (stealth ink) for dot patterns, that is, five colors of inks, are required for printing, and the stealth ink is particularly expensive.

According to WO2007/021249, there was a problematic point in which, while images are expressed only with CMY noncarbon inks using composite black that expresses pseudo black color, vivid black cannot be expressed, as the composite black is only thick charcoal color.

In light of the above-described problematic points, the present invention aims to express vivid colors without increasing the number of colors, and suppresses a printing cost of printing mediums printed with the dot pattern. In this way, without using inks with different frequency characteristics, graphics and dot patterns can be superimposed and printed with one color, which had been conventionally considered impossible.

Means to Solve the Problems

The present invention employs the following means to solve the above problems.

(1) The printing medium of the invention is read out by an optical reading unit; the read bitmap image data is decoded into predetermined information by an image analysis processing unit; the printing medium is superimposed and printed with a dot pattern arranged with grid dots according to a predetermined rule, for defining the predetermined information, and a letter, a drawing pattern, a photograph and the like printed using halftone dots; and the printing medium is printed in a way in which dots on the printing medium are detected from brightness information recorded in the bitmap image data according to a predetermined method, and the dots are determined as either the grid dots that constitute the dot pattern or the halftone dots by the image analysis processing unit.

Here, the brightness information indicates brightness of all the colors, and, since black has the lowest brightness, the grid dots can be determined by printing the dot pattern in black and comparing with the brightness of the colors expressed by the halftone dots. If the difference is subtle, brightness of colored part may be enhanced and printed, or brightness of the colored part read out by the image analysis processing unit may be calibrated to enhance the brightness for determination. In this way, the dot pattern can be recognized by detecting only the grid dots regardless of the optical reading unit that utilizes frequency characteristics or the ink used.

(2) Further, when calculating the number of pixels that constitutes dots detected from the bitmap image data formed with pixels according to a predetermined method, and determining the dots either as the grid dots or the halftone dots based on whether the number of pixels is larger or smaller in relation to a preset threshold value, the above described image analysis processing unit determines the dots as the grid dots when the number of pixels that constitutes the dots is larger than the threshold value, and determines the dots as the halftone dots when the number of pixels that constitutes the dots is smaller than the threshold value.

In this way, even when brightness decreases in the color of a superimposing part where CMY halftone dots are overlapped and determination of the grid dots and halftone dots based on the brightness becomes difficult, the halftone dots can be distinguished from the grid dots by printing so as to make the number of pixels constituting the superimposing part equal to or lower than the threshold value. It will be appreciated that even if CMYK are used for color printing and brightness of the halftone dots printed in K and the grid dots are in the same range, the numbers of pixels constituting both the grid dots and the halftone dots are used for enabling determination.

(3) Further, the grid dots and the halftone dots are printed using the same ink.

In this way, the dot pattern can be recognized by detecting only the grid dots, even when the grid dots and the halftone dots are printed using the same kind of ink.

(4) Further, the grid dots and the halftone dots are printed using an ink that absorbs infrared light of a predetermined wavelength range.

In this way, when recognizing a dot pattern using an optical reading unit that images only infrared light, even if the halftone dots are printed with CMYK (carbon black that absorbs infrared light) that are used in general printing and the grid dots are printed with an ink that absorbs infrared light just like a K ink, the halftone dots and the grid dots can be determined by the number of pixels that constitute both dots.

(5) Further, the halftone dots that are adjoiningly printed are printed in predetermined halftone dot density so that the image analysis processing unit can detect each dot of the halftone dots without connecting one another from the bitmap image data.

In this case, the grid dots can be determined by printing the halftone dots in predetermined halftone density while considering printing accuracy so as not to make the grid dots indistinguishable when the number of the pixels constituting connected halftone dots exceeds the threshold value. It should be noted that even if part of halftone dots are connected due to variation of printing, the connection can be separated as the connected part has somewhat higher brightness.

(6) Further, when the grid dots are a rectangular shape or an elliptic arc shape and the length of the shorter side thereof is defined as L (inch), and print screen ruling of halftone dots is defined as D (lpi), if the shape of the halftone dots is a circle, the halftone dots are printed in the predetermined halftone dot density $X(\%)$ of less than $25 \, \pi L^2 \times D^2$, and if the shape of the halftone dots is a square, the halftone dots are printed in the predetermined halftone dot density $X(\%)$ of less than $50 \, L^2 \times D^2$.

In this way, as long as variation of printing is subtle, the dots can be determined by the number of pixels constituting the grid dots and the halftone dots. However, if the variation of printing is too large, the halftone dots are preferably printed by decreasing the predetermined halftone density by approximately 10%.

(7) In the information processing method of the invention, an optical reading unit reads out a printing medium on which a dot pattern arranged with grid dots in accordance with a predetermined rule, for defining predetermined information, and a text, a drawing pattern, a photograph and the like printed using halftone dots are superimposed and printed, and an image analysis processing unit decodes the read bitmap image data into the predetermined information, in which the image analysis processing unit detects dots in accordance with a predetermined method from brightness information recorded in the bitmap image data, determines the dots as either the grid dots that constitute the dot pattern or the halftone dots, and decodes into the predetermined information.

In this way, only the grid dots can be recognized regardless of the type of the optical reading unit and the reading method.

(8) Further, when calculating the number of pixels that constitutes dots that are detected in accordance with a predetermined method from the bitmap image data formed with pixels and determining the dots as either the grid dots or the halftone dots based on whether the number of the pixels is larger or smaller in relation to a preset threshold value, the image analysis processing unit decodes into predetermined information by determining the dots as the halftone dots if the number of the pixels constituting the dots is smaller than the threshold value, or determining the dots as the grid dots if the number of the pixels constituting the dots is larger than the threshold value.

(9) Further, the image analysis processing unit comprises a threshold table or a predetermined calculation formula, detects a pixel value that indicates brightness information excluding the dots within a predetermined area of the read bitmap image data, calculates a threshold value corresponding to the pixel value from the threshold table or the predetermined calculation formula, and determines grid dots.

When the optical reading unit is inclined or somewhat separated from the medium surface, the imaging area increases, and, as the result, the grid dots and halftone dots become small. The number of pixels forming the grid dots decreases, falling below the threshold value of the preset number of pixels, and the grid dots may be determined as halftone dots. However, even in such a case, the grid dots can be determined using a threshold table corresponding to the brightness or a threshold value calculated by a predetermined calculation formula. To this end, as the brightness of the brightness measuring area in the middle of the image data deployed on the image memory decreases in a state in which the optical reading unit is inclined or somewhat separated from the medium surface, the dots may be determined as either the grid dots or the halftone dots by dynamically decreasing the threshold value of the number of pixels according to the brightness.

(10) Further, the image analysis processing unit comprises: a first threshold table or predetermined calculation formula for determining the halftone dots and the grid dots; and a second threshold table or predetermined calculation formula for determining grid dots, at least excluding halftone dots, that are read out by an optical reading unit, calculates a threshold value corresponding to the pixel value by selecting either thereof by a predetermined method, and determines grid dots.

In this way, the grid dots can be determined using two different threshold tables or predetermined calculation formulas whether when determining the grid dots minimally printed so as not to be conspicuous in a general grid dot printing medium and when distinguishing the grid dots from halftone dots on a medium in which grid dots are relatively largely printed. As one specific example, both grid dots whether on a general grid dot printing medium or a printing medium printed with the same ink as the one for the grid dots can be read by an optical reading unit that reads only grid dots utilizing frequency characteristics (optical characteristics), and predetermined information can be decoded.

(11) Further, the printing medium is printed with the grid dots and the halftone dots using the same ink.

(12) Further, the printing medium is printed with the grid dots and the halftone dots using an ink that absorbs infrared light of a predetermined wavelength range; the optical reading unit comprises a filter that blocks at least visible light and an infrared irradiation unit that irradiates infrared light at lease within the predetermined wavelength range; and the optical reading unit reads out the printing medium printed with an ink that absorbs infrared light of the predetermined wavelength range.

(13) Further, after the optical reading unit reads out a printing medium printed with the halftone dots in predetermined halftone dot density so that the halftone dots that are adjoiningly printed do not connect to one another, the image analysis processing unit detects each dot from the read bitmap image data so that the halftone dots do not connect to one another, determines the dots as either the grid dots or the halftone dots, and decodes into predetermined information.

(14) Further, when the grid dots are a rectangular shape or an elliptic arc shape and the length of the shorter side thereof is defined as L (inch), and print screen ruling of halftone dots is D (lpi): if the grid dots are a rectangular shape and the shape of the halftone dots is a circle, the halftone dots are printed in the predetermined halftone dot density X(%) of less than 25 $\pi L^2 \times D^2$; if the grid dots are a rectangular shape and the shape of the halftone dots is a square, the halftone dots are printed in the predetermined halftone dot density X(%) of less than 50 $L^2 \times D^2$; if the grid dots are an elliptic arc shape and the shape of the halftone dots is a circle, the halftone dots are printed in the predetermined halftone dot density X(%) of less than 25 $\pi^2 L^2 \times D^2/4$; and if the grid dots are an elliptic arc shape and the shape of the halftone dots is a square, the halftone dots are printed in the predetermined halftone dot density X(%) of less than 50 $\pi L^2 \times D^2/4$.

(15) Further, when a pixel value that indicates brightness information recorded in the bitmap image data formed with pixels is equal to or less than a predetermined threshold value, the image analysis processing unit detects the pixels as dots, determines the dots as either grid dots or the halftone dots, and decodes into predetermined information.

(16) Further, the image analysis processing unit, in all pixels of each row of the bitmap image data formed with pixels, detects respective pixel values that indicate brightness information recorded in a first pixel and a second pixel that is arranged in a horizontal direction from the first pixel and apart from the first pixel by a predetermined number of pixels, detects a smaller one of the pixel values as a dot when the absolute value of the difference of the both pixel values is equal to or more than a predetermined threshold value, determines whether the dots are grid dots or the halftone dots, and decodes into predetermined information when the dots are the grid dots.

(17) Further, the predetermined threshold value can be obtained by detecting a pixel value that indicates brightness information excluding the dots within a predetermined area in the middle of the bitmap image data and calculating using a threshold table or a predetermined calculation formula corresponding to the pixel value.

In this way, even if individual difference is generated in characteristics of the optical reading unit, and brightness information of the read bitmap image data is varied, the grid dots can de determined by calculating an optimal threshold value in response to the variation. Also, when the optical reading unit is not completely in contact with the medium surface or the optical reading unit is inclined in relation to the printing medium surface, while brightness of the read bitmap image data decreases, the grid dots can be determined even in such a case by calculating an optimal threshold value in response to the case.

(18) Further, the predetermined threshold value can be obtained for each row by detecting a pixel value that indicates brightness information excluding the dots within a predetermined area in the middle of each row in each row of the bitmap image data, and calculating using a threshold table or a predetermined calculation formula corresponding to the pixel value.

In this way, while, when the optical reading unit is inclined in relation to the medium surface, brightness of the read bitmap image data decreases in a reverse direction from the side in which the optical reading unit is inclined, the grid dots positioned in each row can be determined further accurately by calculating an optimal threshold value for each row of the bitmap image data.

(19) The information processing device of the invention reads out a printing medium on which a dot pattern in which grid dots are arranged in accordance with a predetermined rule for defining predetermined information and a letter, a drawing pattern, a photograph and the like printed using halftone dots are superimposed and printed by an optical reading unit, and decodes the dot pattern constituted by the grid dots into the predetermined information from the read bitmap image data by an image analysis processing unit. In the information processing device, the image analysis processing unit detects dots from brightness information recorded in the bitmap image data by a predetermined method, determines whether the dots are the grid dots that constitute the dot pattern or halftone dots, and decodes into the predetermined information when the dots are the grid dots.

(20) Further, when calculating the number of pixels that constitutes dots detected in accordance with a predetermined method from the bitmap image data formed with pixels and determining the dots as either the grid dots or the halftone dots based on whether the number of the pixels is smaller or larger in relation to a preset threshold value, the image analysis processing unit decodes into predetermined information by determining the dots as the halftone dots when the number of the pixels constituting the dots is smaller than the threshold value, or determining the dots as the grid dots when the number of the pixels constituting the dots is larger than the threshold value.

(21) Further, the printing medium is printed with the grid dots and the halftone dots using an ink that absorbs infrared light of a predetermined wavelength range, and the optical reading unit comprises a filter that blocks at least visible light and an infrared irradiation unit that irradiates infrared light of at least within the predetermined wavelength range.

In this way, as CMY used in general printing do not absorb infrared light, by capturing only the halftone dots printed with a K ink that absorbs infrared light and the grid dots printed with an ink that absorbs infrared light by the optical reading unit, the grid dots can be determined based on brightness and the number of pixels that constitutes both the halftone dots and the grid dots. That is, determination is performed between only the two colors, the halftone dots printed with K ink and the grid, or, if a K ink is used for printing the grid, the grid may be determined by the one color.

(22) Further, the dot pattern is formed by arranging one line or a plurality lines of stream dot patterns arranged in accordance with the steps of: continuously disposing a plurality of reference dots in a line in accordance with a predetermined rule; disposing a first virtual reference line that comprises a straight line, a polygonal line and/or a curved line that connects the plurality of reference dots; disposing at least one second virtual reference line that is defined at a predetermined position from the reference dots and/or the first virtual reference line and comprises a straight line and/or a curved line; providing a plurality of virtual reference points at predetermined positions on the second virtual reference line; and disposing an information dot that defines X and Y coordinate values and/or a code value by a distance and a direction from the virtual reference point, at the end point of a vector expressed with the virtual reference point as a start point.

According to this, by forming a plurality of stream dot patterns with certain intervals of the reference points, X and Y coordinate values are tightly arranged and defined on a printing medium enabling generation of trajectory information.

Further, when a text, staff notation, map, figure and the like are printed on the printing medium, and operation is performed by tracing or touching the line segment using a scanner pen, the dot pattern can be effectively arranged by forming a stream dot pattern only along the line segment. Also, without being restricted to the shape of a rectangular area when a dot pattern that defines X and Y coordinates is formed as a two dimensional code (for using as an index), the dot pattern can be formed by repeating a set of certain information in a flexible shape tailored to an information area visibly formed on a medium surface.

(23) Further, the stream dot is further provided with a reference dot, at a predetermined position, that is a reference for defining the second virtual reference line and/or defining the direction of the dot pattern and a pair of X and Y coordinate values and/or a code value.

According to this, by providing a new reference point, the direction of the stream dot pattern and a set of certain information can be easily defined without using an information dot, suppressing unnecessary reduction of information. Further, by arranging a new reference point, the position of a virtual reference point as the start point of the information dot can be correctly indicated.

Advantageous Effects of the Invention

According to the present invention, the dot pattern can be recognized by detecting only the grid dots regardless of the optical reading unit that utilizes frequency characteristics or the ink used.

Therefore, even when grid dots and halftone dots are printed using the same kind of ink, the dot pattern can be recognized by detecting only the grid dots. In this way, the dot pattern can be recognized by superimposing and printing the dot pattern and a graphic on a printing medium using one color such as in a black-and-white print.

BRIEF DESCRIPTION OF THE DRAWINGS

FIGS. 1A to 1C are enlarged views illustrating a state in which halftone dots and grid dots are superimposed and printed with inks of the same frequency characteristics.

FIG. 2 is an enlarged view showing a state in which halftone dots and grid dots are superimposed and printed with one color ink.

FIG. 3 is an enlarged view showing a state in which halftone dots and grid dots are printed with inks of different frequency characteristics.

FIGS. 5A to 5E are diagrams illustrating a method for determining the size of halftone dots.

FIG. 7 is a diagram illustrating another method for illustrating a method for determining halftone dots and grid dots.

MODE FOR CARRYING OUT THE INVENTION

Figure 4A:
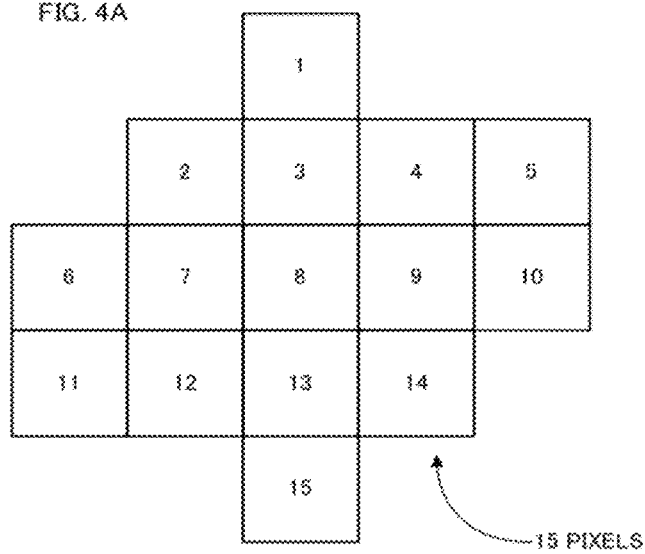
FIGS. 4A to 4D are diagrams expressing a halftone dot and a grid dot as bitmap images.

The embodiment of the invention will be illustrated with reference to the drawings.

FIGS. 1A to 3 are enlarged views illustrating a state in which halftone dots and grid dots (dots used for a dot pattern) are superimposed and printed.

FIGS. 1A to 1C illustrates a state in which halftone dots and a dot pattern are superimposed and printed, and are examples of reading within a visible light range using an optical reading unit. FIG. 1A shows a state of a general halftone print of a graphic. FIG. 1B shows a state of a dot pattern. FIG. 1C shows a state in which a graphic and a dot pattern are superimposed and printed.

Here, the general graphic print means a general halftone print of a text, a photograph, an illustration and the like. The dot pattern is a kind of two-dimensional code and an automatical recognition technique that allows input and output of a variety of information and programs. Specifically, it is disclosed in Japanese Patent No. 3706385, Japanese Patent No. 3858051, Japanese Patent No. 3771252, Japanese Patent Application No. 2009-165163 and the like. Alternatively, any dot pattern, of course, may be used.

The general graphic print is performed using three colors of C (cyan), M (magenta), and Y (yellow), or four colors of C, M, Y, and K (black). On the other hand, the dot pattern is printed using a K ink (FIG. 1B). Then, the general graphic and the dot pattern are superimposed and printed as shown in FIG. 1C. In this way, when a user touches a printing medium using a dedicated scanner (optical reading unit) for reading the dot pattern, information such as a sound, an image and the like corresponding to the content of the graphic print is output from an information device (a personal computer, PDA and the like) connected to the scanner.

In this embodiment, the ink used for printing these graphics and dot patterns may have any frequency characteristics as long as the optical reading unit can read the graphics and dot patterns for determining the difference of brightness between the halftone dots and the dot patterns within the visible light range. That is, while it is not drawn, by setting predetermined brightness as a threshold value, if the dot part of the bitmap image data read by the optical reading unit is larger than the threshold value, the dot is determined as a grid dot, and, if the dot part is smaller than the threshold value, the dot is determined as a halftone dot. In this way, recognition of the dot pattern is made possible by detecting only grid dots regardless of the optical reading unit that utilizes frequency characteristics (optical characteristics) and the ink used. Here, at a position expressing composite black by mixing C, M, and Y, as shown in FIG. 2, it is necessary that, in addition to the difference of brightness, the number of pixels constituting the halftone dots and grid dots that are read out by the optical reading unit and recorded in bitmap image data are compared and, if the number is more than a predetermined pixel number, the dots are determined as grid dots. It will be appreciated that, when using four colors, C, M, Y, and K (black) for general graphic printing, the predetermined pixel number is used for determination at a position where K (black) is printed. It should be noted that, in FIG. 2, while the halftone dots are expressed as a square shape, the shape is not limited to this, and the grid dots can be determined similarly in halftone dot printing of a circle and other shapes.

FIG. 2 shows a state in which halftone dots and a dot pattern are printed with one color ink.

In FIG. 2, M ink is used for printing both the halftone dots and the grid dots. In such a case, in the present invention, it is possible to determine as grid dots if the number of pixels is larger than a predetermined number of pixels by comparing the number of pixels constituting the halftone dots and the grid dots read out by the optical reading unit and recorded in bitmap image data. However, density of halftone dots and/or the screen ruling of the halftone dots are required to be restricted for printing so that the size of the halftone dots always becomes smaller than the grid dots. It will be appreciated that accuracy of printing, such as dot gain at printing, paper property, and characteristics of ink should also be considered to determine the size of the halftone dots so that the size of the halftone dots always becomes smaller than the grid dots in the printing result.

In this way, the present invention can determine halftone dots and grid dots even when printed in one color. In this way, the dot pattern print can also be printed for a document, a text, and a graphic printed only in one color, such as one color printing of news papers, examination sheets, and questionnaires.

It should be noted that the ink used for printing in one color may be a C ink, an Y ink, or a K ink, instead of an M ink.

FIG. 3 shows a state in which a graphic and a dot pattern are printed using inks of different frequency characteristics. In FIG. 3, the graphic is printed using four colors, C, M, Y and K, and the dot pattern is printed using one color K ink. Then, inks that reflect or transmit infrared light are used for printing C, M, and Y, and an ink that absorbs infrared light or carbon black is used for printing K. In such a case, the optical reading unit performs reading within infrared range and only the halftone dots and grid dots printed with K are recorded in bitmap image data. As the result, as the pixel values (brightness) constituting the halftone dots and the grid dots become almost the same, the numbers of pixels constituting respective dots are compared, and, when the pixel number is more than a predetermined pixel number, the dots can be determined as the grid dots. It should be noted that the optical reading unit is configured to irradiate infrared light to a medium surface, and reads the infrared light only in the reflection light through a visible light blocking filter (infrared transmitting filter).

In this way, in the present invention, inks of different frequency characteristics may be used for respective ink colors.

Figure 4B:
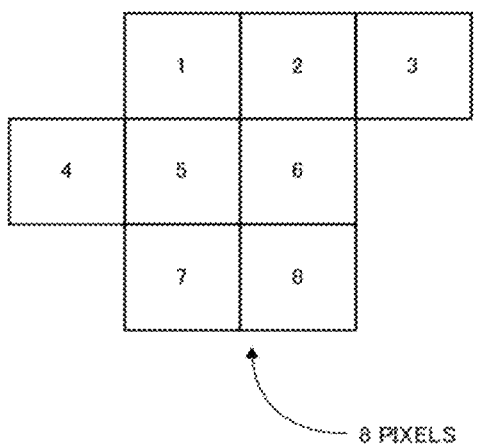

FIGS. 4A and 4B are diagrams expressing a halftone dot and a grid dot as bitmap images. FIG. 4A shows a grid dot and FIG. 4B shows a halftone dot.

The graphic and the dot pattern read out by the optical reading unit are deployed as a bitmap image on an image memory. That is, the graphic and the dot pattern are expressed by being divided into a lot of fine points (pixels) in a grid pattern.

On the image memory, the halftone dots and grid dots are brightly imaged than the part where the halftone dots and grid dots are not printed. The image analysis processing unit inside the scanner detects a part where darkly imaged in the bitmap image data. Then, the image analysis processing unit calculates the number of pixels constituting the dark part, and determines whether that dark part is the grid dots or the halftone dots by the size of the number of the pixels. A threshold number of pixels is set as a criteria of determination. When the number of pixels is larger than the threshold value, the pixels are determined as grid dots, and the number of pixels is smaller than the threshold value, the pixels are determined as halftone dots. It should be noted that, when detecting halftone dots and/or grid dots based on brightness, a predetermined brightness threshold is used for determination. It should be noted that grid dots may be determined when the brightness is equal to or more than a threshold value and halftone dots may be determined when the brightness is less than the threshold value, or the grid dots may be determined when the brightness exceeds the threshold value and the halftone dots may be determined when the brightness is equal to or less than the threshold value.

For example, when the threshold value is set as 12, as FIG. 4A has 15 pixels, it is determined as a grid dot. On the other hand, as FIG. 4B has eight pixels, it is determined as a halftone dot.

Figure 4C:
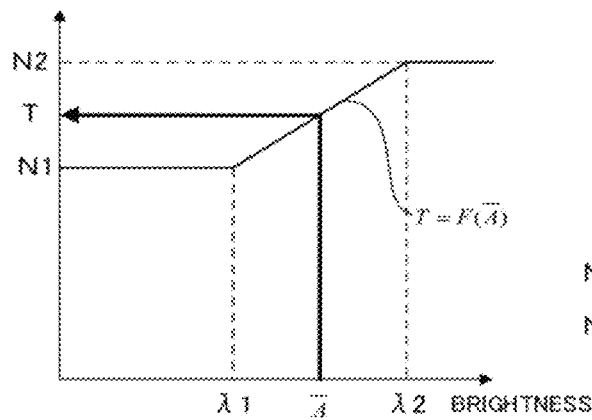

Here, in a state in which the optical reading unit is inclined to or somewhat separated from a medium surface, the imaging area becomes larger, and, as the result, the grid dots and halftone dots become smaller and the number of pixels constituting the grid dots becomes smaller, falling below the threshold of the preset number of pixels, and may be determined as halftone dots. To avoid this, as brightness of image data deployed on the image memory decreases in a state in which the optical reading unit is inclined to or somewhat separated from a medium surface, the threshold of the number of pixels may be dynamically decreased depending on the brightness on that occasion. When the central area of the image data is defined as a brightness measuring area, the average value of pixel values excluding the dots is calculated in this brightness measuring area, and $$T = F(\overline{A})$$

calculated from this average value is defined as the threshold number of pixels as shown in FIG. 4C. If the number of pixels is less than the threshold value T, the pixels are determined as halftone dots, and if the number of pixels is equal to or more than the threshold value, the pixels are determined as grid dots. In this calculation formula, if the average number of pixel values is equal to or more than $\lambda 1$ and equal to or less than $\lambda 2$, the threshold of the number of pixels becomes certain values, N1 and N2, respectively and if the average number of pixel values is between $\lambda 1$ to $\lambda 2$, the threshold value becomes $$T = F(\overline{A})$$

For example, if the image data deployed on the image memory by imaging 4 millimeter square of the printing medium surface has a resolution of approximately 144×144, brightness information of 8 bits (0-255), a grid diameter of 0.1 mm or more, print screen ruling of halftone dots of some 175 lpi, and halftone dot density of less than 20%, the values of $\lambda 1=60$, N1=8, $\lambda 2=180$, and N2=12 may be set. It will be appreciated that these values will differ depending on a printing method, the kind of ink, dot gain, paper property, capability of the optical reading unit and the like.

In general, in a general grid dot printing medium, only grid dots are read by an optical reading unit and predetermined information is decoded either by printing only the grid dots or using inks of different frequency characteristics (optical characteristics) respectively for printing the grid dots and printing halftone dots. In such cases, the size of the grid dots is minimized or invisible ink is used so that the grid dots do not become conspicuous. Here, to eliminate dispersing of the ink for grid dots upon printing and noises such as missing/corrupted imaging elements of the optical reading unit, a threshold value should be similarly set for the number of pixels. However, if the image data has only a resolution of approximately 144×144, the number of pixels constituting such a noise is as small as one to two (the number increases when the resolution of the read image data is large), thus, a small value is set for a threshold value for determining the minimally printed grid dots. Therefore, different threshold values of the number of pixels should be set between a general grid dot printing medium and a printing medium for which halftone dots and grid dots are determined by the number of pixels constituting the halftone dots and grid dots.

Figure 4D:
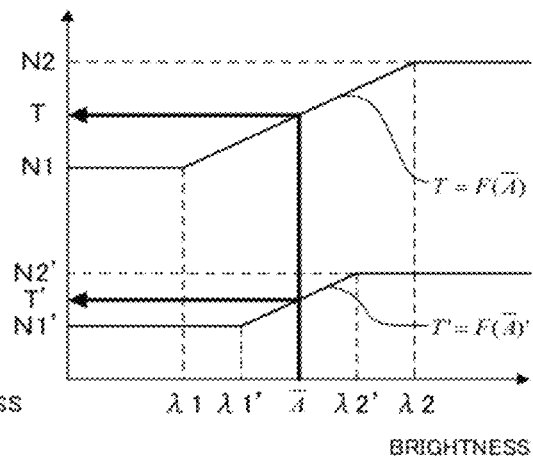

Thus, as shown in FIG. 4D, a second threshold calculation formula for general grid dot printing mediums $$T' = F \overline{(A)}'$$

is set.

If predetermined information cannot be decoded by reading grid dots using either the first threshold calculation formula T or the second threshold calculation formula T', the other threshold calculation formula is used to analyze again the read image data. When the image data can be analyzed, the same threshold calculation formula is continuously used. If the image data cannot be analyzed again thereafter, the other threshold calculation formula is used again to analyze the read image data. For example, if the image data obtained by imaging 4 millimeter square of the printing medium and deployed on the image memory has a resolution of approximately 144×144, brightness information of 8 bits (0-255), a grid diameter of 0.1 mm or more, print screen ruling of halftone dots of some 175 lpi, and halftone dot density of less than 20%, the values of λ1=60, N1=8, λ2=180, N2=12, λ1=80, N1'=2, λ2'=160, and N2'=4 may be set. It will be appreciated that these values will differ depending on a printing method, the kind of ink, dot gain, paper property, capability of the optical reading unit and the like.

FIGS. 5A to 5E are diagrams for illustrating a method for determining the size of halftone dots.

In the present invention, the size of the halftone dots is determined in relation to the size of the grid dots. The grid dots are a rectangular shape as shown in FIG. 5A or an elliptic arc shape as shown in FIG. 5B. It should be noted that the grid dots are, in most of the cases, a square shape or a circle shape. Particularly, the grid dots are often defined as a square shape for convenience of creating data and to decrease data volume.

Meanwhile, the circular shaped halftone dots are arranged as shown in FIG. 5C, and the square shaped halftone dots are arranged as shown in FIG. 5D. The dashed lines show the cases in which density of halftone dots is 70% in FIG. 5C, density of halftone dots is 50% in FIG. 5D. In this way, if the density of halftone dots is 70% or 50% or more, halftone dots are connected one another on data. As the result, the number of pixels constituting the halftone dots becomes large, and the image analysis processing unit misjudges the halftone dots as grid dots. Further, with a general offset press, rotary press, and a variety of printers, even when halftone density is set 50% for circular halftone dots and 40% for square halftone dots, the dots may be connected as shown in FIG. 5E. When printing extremely small dots in this way, connection of halftone dots occurs due to dot gain in which a printing area is expanded attributable to seepage of the ink on the periphery, the kind of ink, a printing method, paper property and the like. While it is not drawn, in general, dots can be printed without being connected if the density is set to less than 40% for circular halftone dots and less than 30% for square halftone dots. However, as the halftone density is suppressed to less than 30-40%, the black color may not be vivid in the image. It will be appreciated that the printing accuracy changes depending on a printing method, the kind of ink, dot gain, paper property, and the capability of the optical reading unit. Here, depending on the printing accuracy, part of the halftone dots may be connected even when the halftone density is suppressed to less than 30-40%, in which case, the image analysis processing unit may be used to determine the dots. As brightness of the connected part is brighter than the central part of the halftone dots, the connection can be separated by comparing the brightness. It should be noted that, when variation of each printing is too large, if the halftone dot density is set to less than approximately 2-30%, the connection of the halftone dots can be completely eliminated and the grid dots can be more accurately determined.

Next, maximum density of halftone dot printing is determined when grid dots are defined in a predetermined size. The short side of the rectangular shaped or elliptic arc shaped grid dots is defined as L inch. Also, print screen ruling of the halftone dots is defined as D lpi. When the halftone dot is a circular shape, the diameter R inch of one halftone dot of halftone dot density X % is $$R = \frac{\sqrt{\frac{X}{\pi}}}{5D}$$

when the radius of the halftone dot is r inch and $\pi r^2/(1/D) = X/100$.

Here, to print so that L becomes larger than R, the halftone dot density X becomes $X < 25\pi L^2 \times D^2$. Here, as the shape of the grid dot is generally a square shape, even if there is no difference when comparing the side length L of the square grid and diameter R of the circular halftone dot, the square has a definitely larger area. As the result, even if there are small variations in printing, the number of pixels constituting dots becomes different, and the grid dots can be determined. If the shape of the grid dots is a circle, the halftone dot density X is required to be decreased by π/4, and X becomes $X < 25\pi^2 L^2 \times D^2/4$.

Also, when the halftone dots are a square, if the side length of the halftone dot is defined as k inch, as $k^2/(1/D) = X/100$, the diameter length K inch of one halftone dot in halftone dot density X % becomes $$K = \frac{\sqrt{2X}}{10D}.$$

Here, to print so that L becomes larger than K, the halftone dot density X becomes $X < 50 L^2 \times D^2$.

Here, as the shape of the grid dots is generally a square shape, even if there is no difference when comparing the side length L of a square shaped grid and the diameter R of a square shaped halftone dot, the square of the grid is absolutely larger, and the number of pixels constituting the dots becomes different even if there are small variation in printing. Thus, the grid dots can be determined. If the shape of the grid dot is a circle, the halftone dot density X is required to be decreased by π/4, and X becomes $X < 50 \pi L^2 \times D^2/4$.

In this way, as long as variation in printing is subtle, the dots can be determined by the numbers of pixels constituting both the grid dots and halftone dots. However, in consideration of decrease in printing accuracy caused by a printing method, the kind of ink, dot gain, paper property, capability of the optical reading unit and the like, if the printing variation is large, it is preferable to print the halftone dots by decreasing predetermined halftone dot density by approximately 10%, as the size of the halftone dots should be determined on the safe side to always become smaller than the size of the grid dots in the printed result. It will be appreciated that, by increasing print screen ruling of the halftone dots as described above, the size of the halftone dots becomes small even in the same halftone density, and the grid dots can be more accurately determined.

Figure 6A:
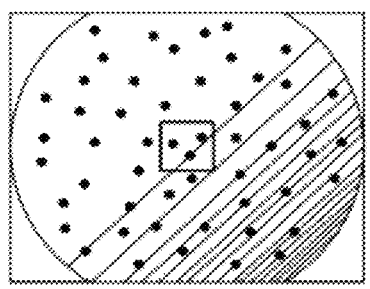
FIGS. 6A to 6C are diagrams illustrating a method for determining halftone dots and grid dots.
Figure 6B:
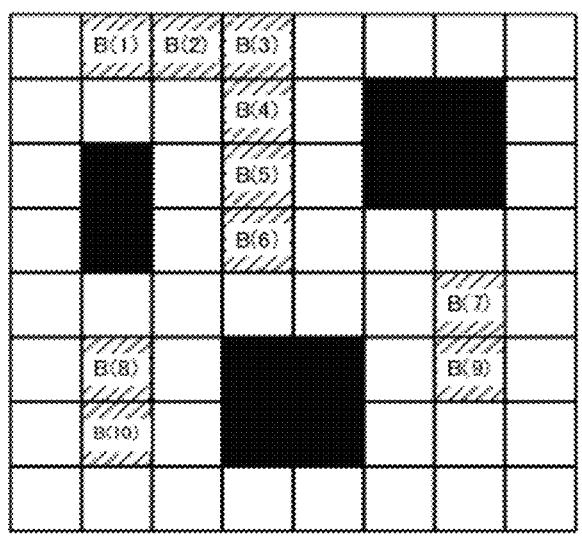
Figure 6C:
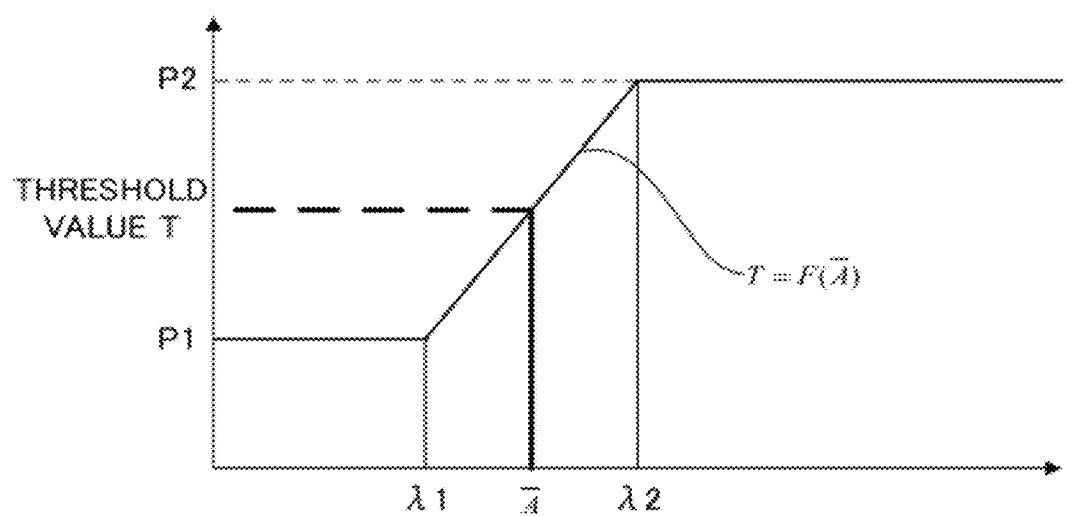

FIG. 6A to 6C are diagrams illustrating a method for determining grid dots and halftone dots.

As described above, the image captured by the optical reading unit is formed by a collection of pixels as a bitmap image on the image memory.

FIG. 6A is image data deployed on the image memory of the optical reading unit. The image analysis processing unit extracts a certain number of pixels within a certain area at the center of the image data. This certain number is determined in relation to the pixel number constituting the grid dots and the pixel number within a certain area at the center of the image data. The certain number of pixels may be defined as less than a quarter of the certain area at the center of the image data determined by the pixel number that is more than four times as much as the maximum number of pixels constituting the grid dot. It should be noted that this calculation method may not be necessarily used if the grid dots and/or halftone dots do not exist in the certain number of extracted pixels.

FIG. 6B is an enlarged view of the extracted area. The image analysis processing unit calculates brightness of each pixel, then, extracts a predetermined number of (e.g., ten) pixels B(1) to B(10) in the order from the highest brightness as brightness measuring areas, and calculates the average value of brightness of each brightness measuring area:

$$\overline{A} = \frac{\sum_{i=1}^{n} B(i)}{n}, n = 10.$$

As shown in FIG. 6C, $$T = F(\overline{A})$$

that is calculated from this average value is defined as a threshold value, and, if the brightness is the threshold value T or more, the dot is determined as a halftone dot and if less than the threshold value, the dot is that is calculated from this average value is defined as a threshold value, and, if the brightness is the threshold value T or more, the dot is determined as a halftone dot and if less than the threshold value, the dot is determined as a grid dot.

It should be noted that to calculate a threshold value, as shown in FIG. 7, a certain number of pixels that are not dots (grid dots and/or halftone dots) within the central area of each line (brightness measuring range) may be extracted for each line of image data. If the resolution of the bitmap image is m×n, pixels in the central areas from the first calculation scanning line to the mth calculation scanning line are extracted. Then, a threshold value is Calculated based on the average value of brightness of pixels extracted for each line in the same way as FIGS. 6A to 6C. Here, the certain number of pixels may be defined as less than a quarter of the brightness measuring range defined at the center area (width) of each line of the image data by the pixel number that is four times as much as the maximum width of pixels constituting the grid dot. It should be noted that this calculation method may not be necessarily used if the grid dots and/or halftone dots do not exist in the certain number of extracted pixels.

Due to the inclination of the scanner, there are darkly imaged area and brightly imaged area in the image data. Therefore, by calculating a threshold value for each line, halftone dots and grid dots can be determined more accurately. Further, to enhance the accuracy of determination, determination may be made by dividing the image data, calculating and detecting a threshold value for each divided area from the average value of brightness of pixels where grid dots and/or halftone dots do not exist in the central areas of the divided areas. It should be noted that to detect grid dots and/or halftone dots on a line, as the threshold values on the line change discontinuously, accuracy of determining grid dots can be further enhanced by calculating and detecting the threshold values by interpolation so as to make these threshold values continuously change on the line.

Figure 8A:
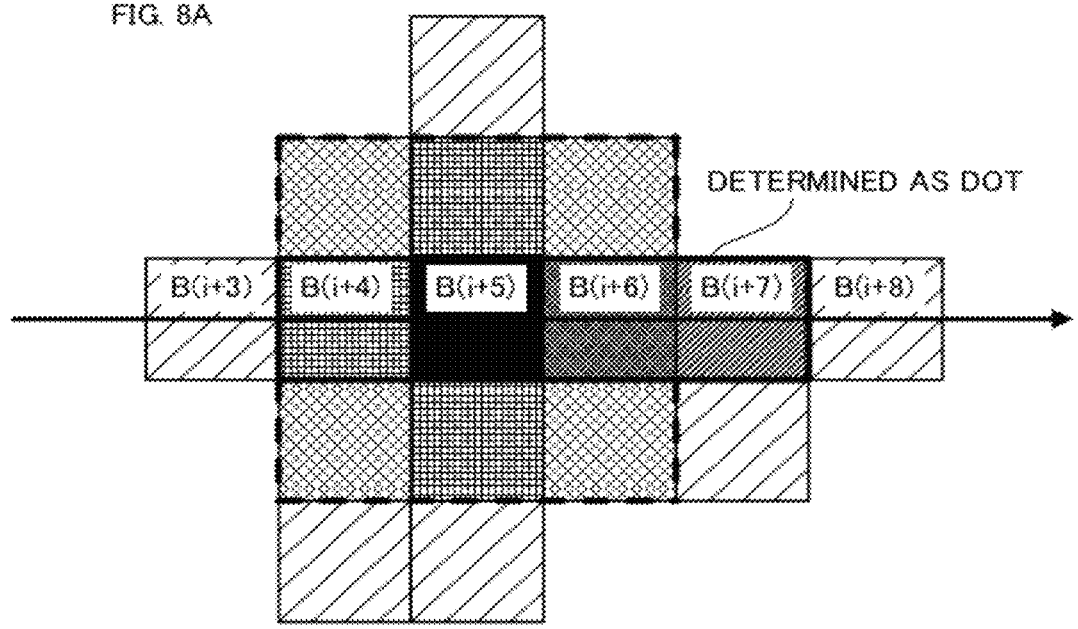
FIGS. 8A and 8B are diagrams for illustrating a method for determining whether halftone dots or grid dots are printed or not.
Figure 8B:
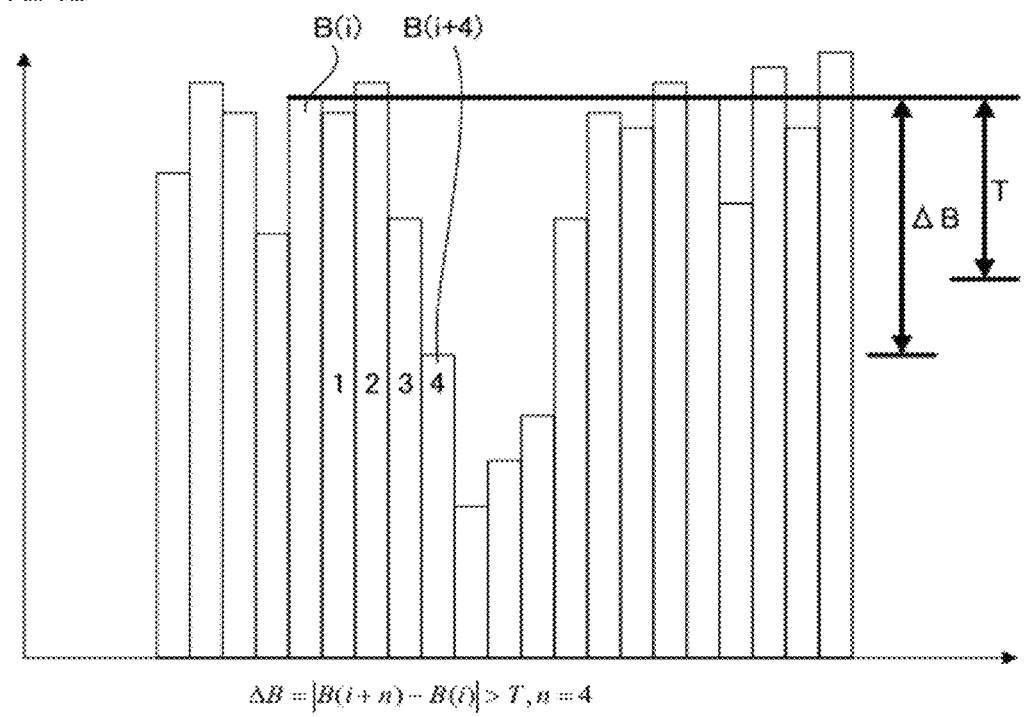

FIGS. 8A and 8B are diagrams illustrating a method of determining an area where grid dots or halftone dots are printed and an area where neither thereof is printed (blank area).

The image analysis processing unit calculates brightness for each line of image data.

FIG. 8A is a specific example of image data. As shown in FIG. 8A, brightness differs depending on pixels. FIG. 8B shows brightness of respective pixels in a bar chart.

The image analysis unit calculates, from horizontally arranged pixels, a difference of brightness between arbitrary pixel i (the first pixel) and a pixel i+n (the second pixel) which is apart from i by a predetermined number of pixels n, and calculates the absolute value of the difference. If the absolute value of the difference is a predetermined threshold value or more, the pixel having smaller brightness is determined as a dot (either a grid dot and/or a halftone dot). It should be noted that, even when the absolute value of the difference of brightness between arbitrary pixel i (the first pixel) and a pixel i+n (the second pixel) that is apart from i by a predetermined number of pixels is the predetermined threshold value or less, if the first pixel is determined as a dot before detecting the absolute value, the second pixel is also determined as a dot by retaining the state of the first pixel as a dot. That is, this is a case in which the first pixel and the second pixel are pixels constituting the same dot. To further enhance accuracy, the second pixel may be retained as a candidate of a dot, this pixel is compared as a first pixel with a second pixel, and, if the absolute value of the difference of brightness therebetween is a predetermined threshold value or more, this first pixel may be formally determined as a dot. Here, if the absolute value of the difference of brightness is a threshold value or less, determination may be continued by retaining this second pixel as a dot candidate. Then, when the first pixel is formally determined as a dot by continuing determination, the previous dot candidate may be formally determined as a dot. When the absolute value of brightness of pixels is used for determining whether the area is printed with a dot or not, if the optical reading unit is inclined, a dark part is generated and the entire part is determined as dots. Also, if a difference value between adjacent pixels is used for determination, small noises (electronic brightness difference and small brightness difference due to the printing environment) are recognized and dots cannot be accurately determined. Therefore, as in this embodiment, an applicable extent of difference is generated in brightness between both pixels by detecting a difference value between a certain distance, thus, the grid dots can be determined, provided, however, the certain distance n is preferably smaller than the number of pixels between adjacent dots.

Figure 9:
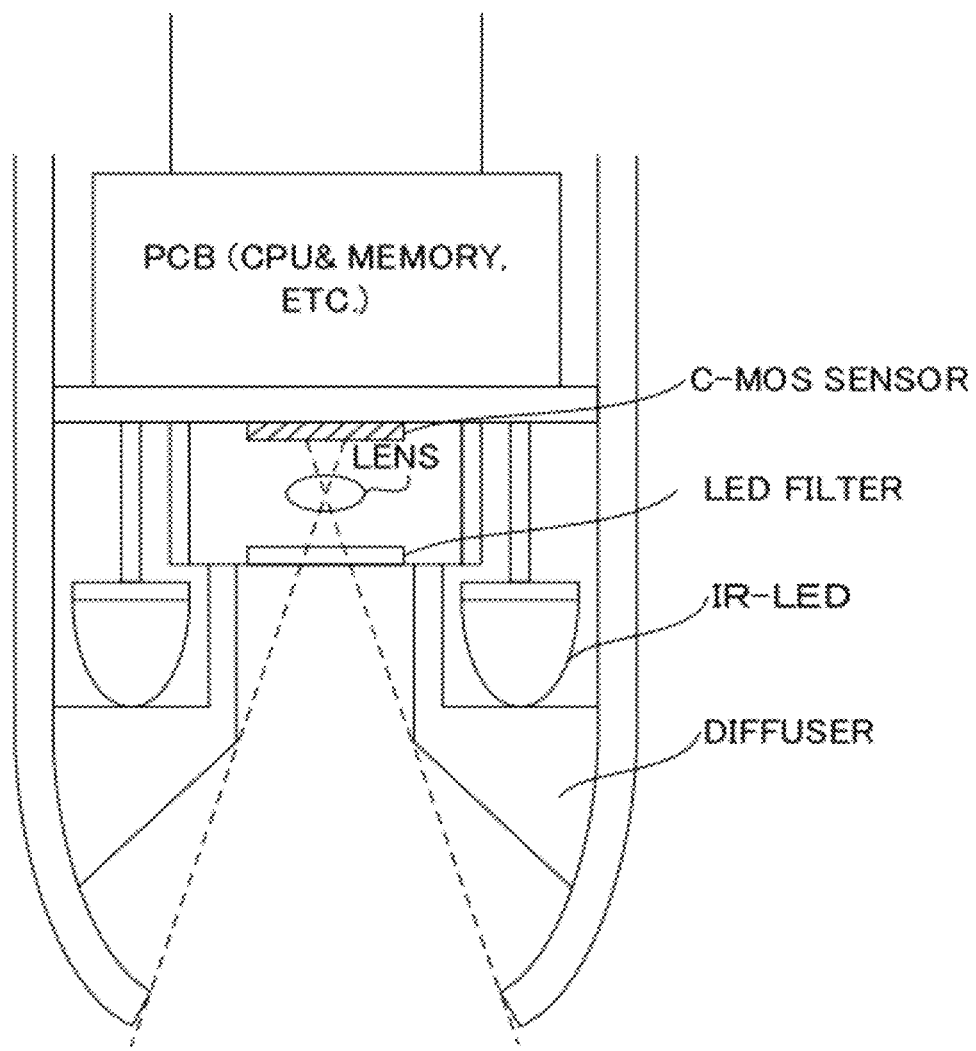
FIG. 9 is a diagram illustrating an optical reading unit.

FIG. 9 is a diagram showing a configuration of a scanner (the optical reading unit).

The scanner comprises an IR-LED as an infrared irradiation unit that irradiates the medium surface, a visible light blocking filter that cuts off visible light wavelength elements of the reflection, a C-MOS sensor as an imaging element, a lens holder embedded with a lens, and a diffuser that diffuses infrared light that is irradiated from the infrared irradiation unit to the medium surface so that the infrared light can be evenly irradiated to the medium surface. The scanner images reflection light of the irradiation light irradiated to the medium. As the dot pattern is printed with an ink having infrared absorbing characteristics, only the grid dot part is imaged in black in the image captured by the C-MOS sensor. It should be noted that the visible light blocking filter may be at the bottom of the C-MOS sensor or around the imaging opening.

As the scanner has such a configuration, and grid dots are determined based on the number of pixels that constitute dots, when an ink that absorbs infrared light is used for grid dots and halftone dots, the grid dots can be determined only by blocking reflection light from a medium surface on which an ink that reflects or transmits infrared light is used and comparing the halftone dots and grid dots that use an ink that absorbs infrared light. It should be noted that if the infrared absorbing ink is not used for printing halftone dots and grid dots, there is no need to use the IR-LED as infrared irradiation means and a visible light blocking filter that cuts off the visible light wavelength elements of the reflection light.

Figure 10A:
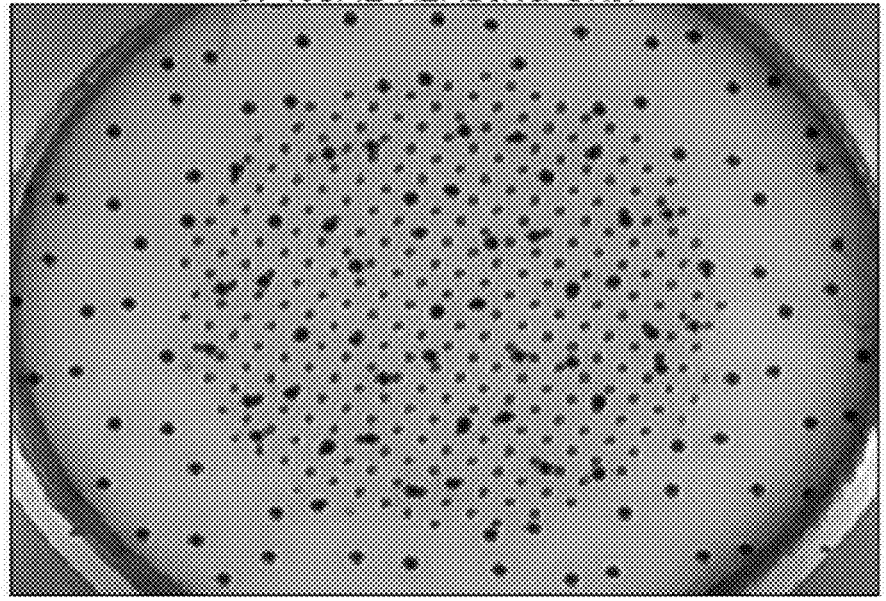
FIGS. 10A and 10B are enlarged views of images capturing a printing medium of the present invention.
Figure 10B:
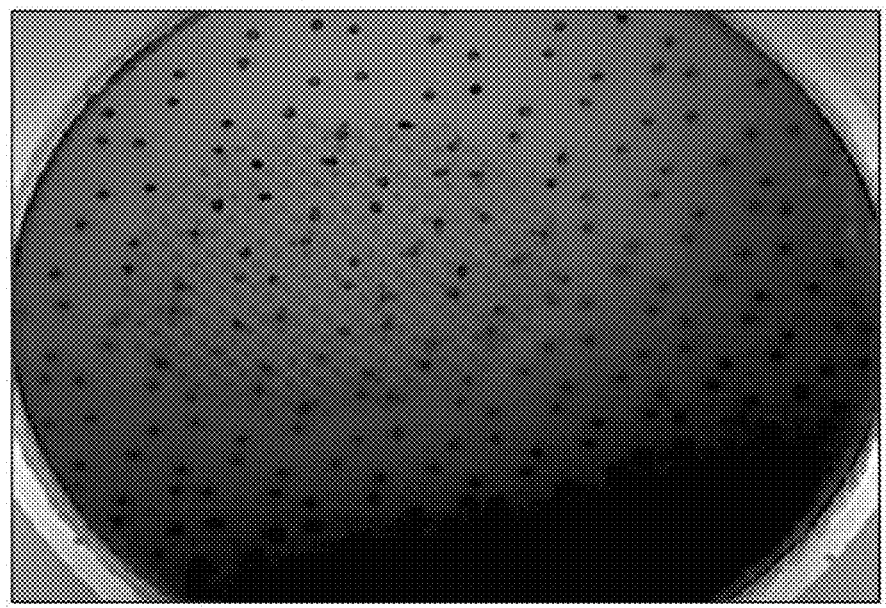

FIGS. 10A and 10B are enlarged views (photographs) of captured images of a printing medium of the present invention. Image data is recorded as shown in FIGS. 10A and 10B on the image memory read out by the optical reading unit. These images are obtained by imaging a 4-mm diameter area on the printing medium surface printed under the condition of the grid dot diameter of 0.1 mm or more, print screen ruling of halftone dots of some 175 lpi, and halftone dot density of 20%, and recorded as image data having brightness information of 8 bits (0-255).

FIG. 10A is image data of a case in which the optical reading unit performs reading by standing perpendicular to the printing medium surface. FIG. 10B is image data of a case in which the optical reading unit performs reading by inclining by approximately 40 degrees. The sizes of the halftone dots and grid dots in FIG. 10B are obviously smaller than the ones of FIG. 10A. Using the calculation formula of FIG. 4C, it is possible to determine the halftone dots and grid dots using different threshold values in FIGS. 10A and 10B even if there is no difference in sizes of part of the halftone dots of FIG. 10A and part of the grid dots of FIG. 10B.

<Description of the Dot Pattern; Stream Dot>

Next, with reference to FIGS. 11A to 16B, an example of a method for forming a stream dot as an example of the dot pattern used in the invention will be described.

The stream dot is a dot pattern disclosed in Japanese Patent Application No. 2009-165163.

FIG. 11A to 12B show an example of steps of forming a stream dot pattern in sequence.

Unlike the conventional dot patterns, the dot pattern of the invention, as step 1, continuously arranges a plurality of reference dots 1 in a line at positions where information is desired to be input/output corresponding to visual information on the medium surface.

Figure 11A:
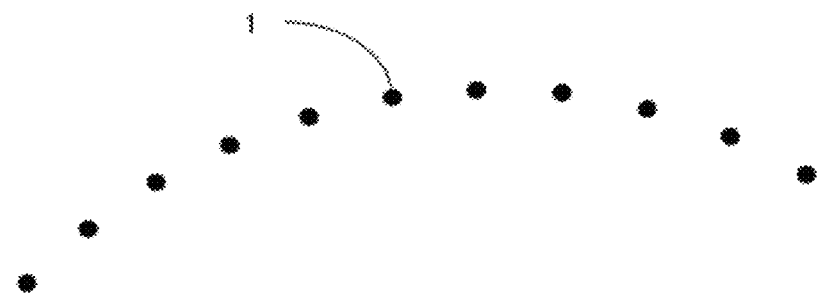
FIGS. 11A to 11C are diagrams illustrating a stream dot pattern as an example of a dot pattern used in the present invention (1).
Figure 11B:
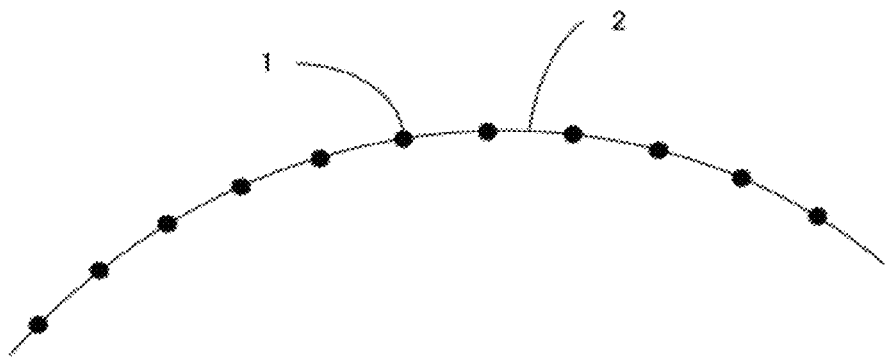

While FIG. 11A arranges reference dots 1 in a curved line, arrangement of reference dots 1 is not limited to this and may be varied in many ways in order to form a dot pattern in a shape tailored to an area for inputting and outputting information, such as combining straight lines and curved lines, and forming a polygonal line constituted a plurality of line segments.

Also, reference dots 1 may be arranged on actual lines visibly formed on the medium surface, or reference dots 1 may be arranged according to a predetermined rule along actual lines. The actual line, here, is a concept contrary to a virtual line, and includes all lines that actually exist. For example, there may be solid lines, dashed lines, dotted lines, straight lines, and curved lines regardless of, in this invention, medium on which the lines are formed (e.g., a display of a video image display device) and material forming the lines (e.g., ink). It should be noted that the dot pattern may be printed or displayed on a display, or unevenness on metal or plastic such as holes, grooves and the like.

It should be noted that, while reference dots are preferably arranged with even intervals from a perspective of enhancing accuracy of reading, the arrangement is not limited to this, and a set of dot patterns of certain information may be defined by combining a plurality of intervals, or both a set of dot patterns of certain information and the direction of the dot pattern may be defined using three different arrangement intervals of reference dots within the set of certain information.

Next, as step 2, a first virtual reference line 2 that connects reference dots 1 that are arranged in a line is provided. While the first virtual reference line 2 is provided as a curved line in FIG. 11B, the first virtual reference line 2 is not limited to this, and the first virtual reference line 2 of a straight line may be provided for reference dots 1 arranged in a curved line, or the first virtual reference line 2 of a curved line may be provided for reference dots 1 arranged in a straight line. That is, depending on where to arrange the second virtual reference line 3, virtual reference point 4, and information dot 5 in the following steps 3 to 5, the first virtual reference line 2 constituted by a straight line, a polygonal line, and/or a curved line that connects reference dots can be flexibly defined.

Figure 13:
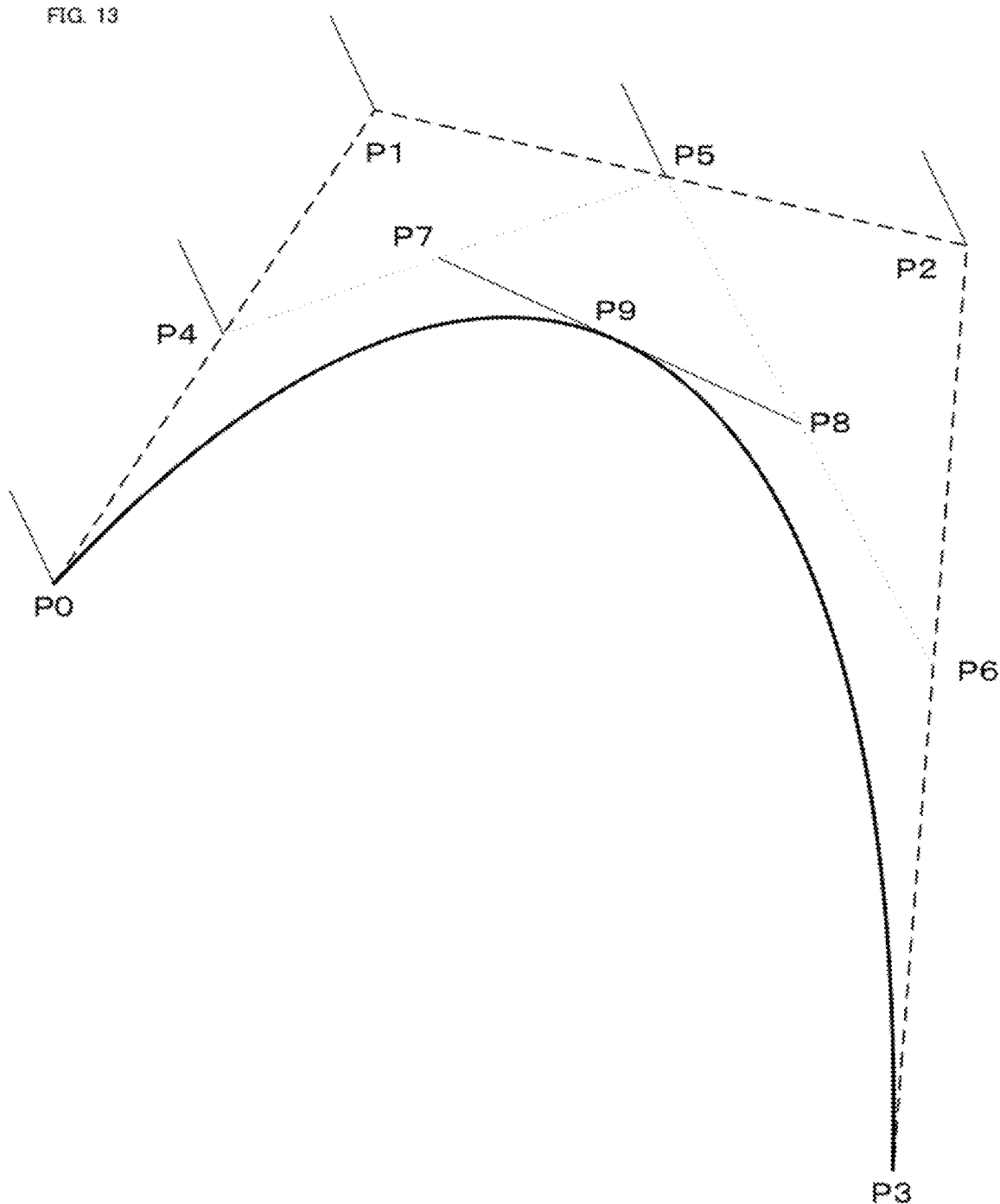
FIG. 13 is a diagram illustrating a stream dot pattern as an example of a dot pattern used in the present invention (3).

It should be noted that, as shown in an example of FIG. 13, if the first virtual reference line 2 is a curved line, the curved line is preferably a bezier curve.

That is, first, reference dots 1 on the first virtual reference line 2 are defined as P0 and P3, and P1 and P2 are defined as given control points. Next, points, P4, P5, and P6, that divide three line segments obtained by sequentially connecting the control points, P0-P1, P1-P2, and P2-P3, in a ratio of 1 to 1 are calculated. Then, points P7 and P8 that divide two line segments obtained by sequentially connecting above points, P4-P5 and P5-P6, in a ratio of 1 to 1 are calculated.

Finally, a point P9 that further divides a line segment P7-P8 that connects the points P7 and P8 in a ratio of 1 to 1 is calculated, and this point becomes as a point on a bezier curve.

By repeatedly performing this step, a bezier curve with control points P0, P1, P2, and P3 can be obtained.

It should be noted that, without limiting to a bezier curve, the first virtual reference line 2 may be provided using a variety of algorithms such as a spline curve obtained by utilizing a spline function, an nth-order polynomial, an elliptic arc and the like.

Also, for the second virtual reference line 3, a curved line can be defined using the same method as the first virtual reference line 2.

Figure 11C:
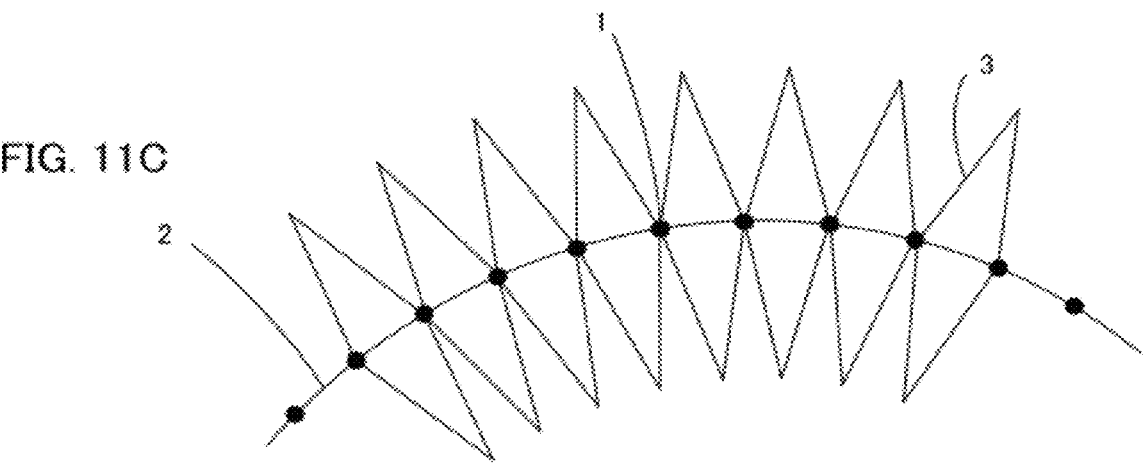

Next, as step 3, a second virtual reference line 3 that is defined at a predetermined position from the reference dots 1 arranged in a line and/or the first virtual reference line 2 is provided. In FIG. 11C, the second virtual reference line 3 is provided with arbitrary angle from neighboring reference dots 1 toward a predetermined point on a vertical line to a tangent line of the first virtual reference line 2 at a middle point between the neighboring reference dots 1. However, the second virtual reference line 3 is not limited to this and may be defined by a variety of ways to provide virtual reference points tailored to an area where information is desirably input/output by the dot pattern as described later.

Also, the second virtual reference line 3 can be provided only on one side of the first virtual reference line 2 to define the direction of the dot pattern, or the second virtual reference lines 3 can be provided on both sides thereof to increase the information amount.

Figure 12A:
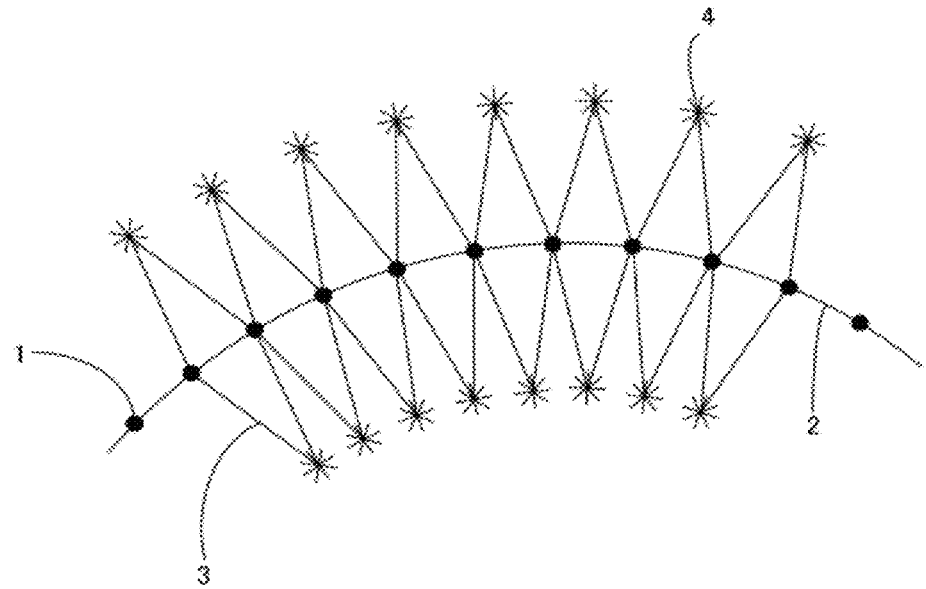
FIGS. 12A and 12B are diagrams illustrating a stream dot pattern as an example of a dot pattern used in the present invention (2).

Next, as step 4, a plurality of virtual reference points 4 are provided at predetermined positions on the second virtual reference line 3. In FIG. 12A, a virtual reference point 4 is provided at an intersection of the second virtual reference lines 3, that is, at a vertex of an isosceles triangle with a straight line that connects neighboring reference dots 1 as a base and the second virtual reference lines 3 as opposing sides. However, the position of the virtual reference point 4 is not limited to this, and may vary in many ways such as providing at a midpoint of the second virtual reference line 3 or on a reference dot 1 instead of on the second virtual reference line 3.

Figure 12B:
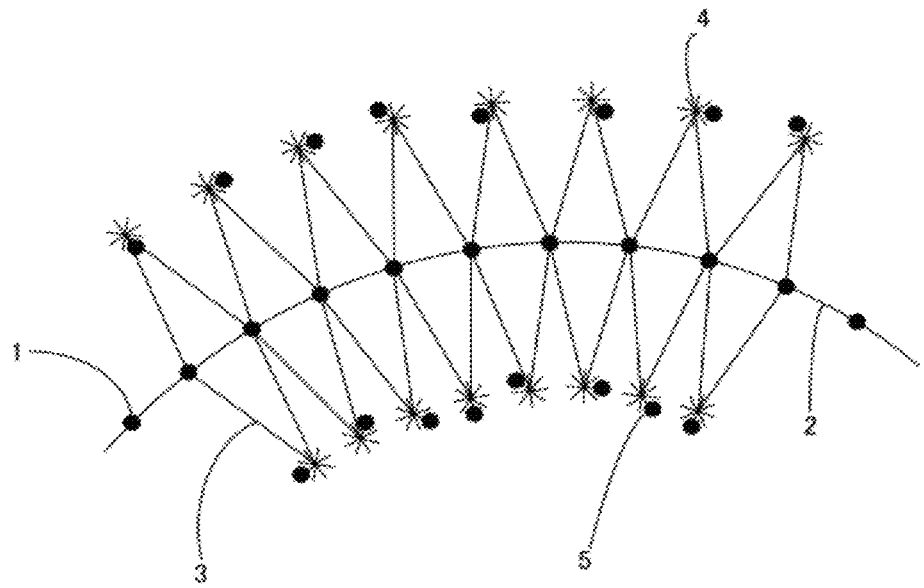

Then, as step 5, an information dot 5 is arranged at the end point of a vector expressed with a virtual reference point 4 as the start point. In FIG. 12B, vector directions from a virtual reference point 4 are eight directions and an information dot 5 is arranged for one virtual reference point 4 to make a distance from the virtual reference point 4 an equal distance. However, arrangement of the information dot 5 is not limited to this, and a plurality of information dots 5 can be arranged in arbitrary direction and arbitrary length, such as arranging an information dot 5 on a virtual reference point 4, arranging with 16 vector directions, or, arranging two information dots 5 for one virtual reference point 4.

Figure 14:
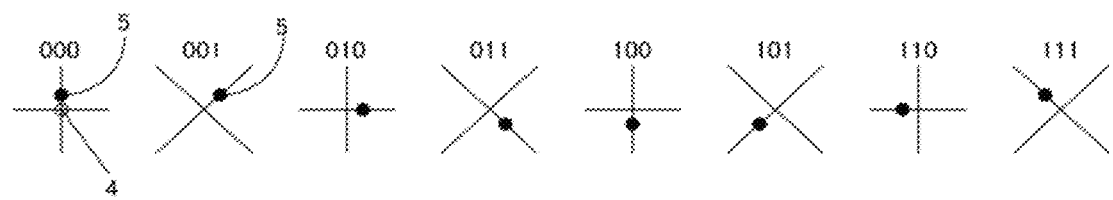
FIG. 14 is a diagram illustrating a stream dot pattern as an example of a dot pattern used in the present invention (4).

FIG. 14 is an enlarged view showing an example of an information dot of a dot pattern and bit expression of data defined therein.

The information dot 5 is a dot used for recognition of a variety of information. This information dot 5 is arranged at the end point of a vector expressed with the virtual reference point 4 as the start point. For example, as shown in FIGS. 12A and 12B, as a dot away from the virtual reference point 4 by 0.1 mm has a direction and a length expressed by a vector, this information dot 5 expresses three bits by rotating and arranging the dot in eight directions by 45 degrees in a clockwise direction.

It will be appreciated that, while three bits are expressed in the example by arranging dots in eight directions, the arrangement can vary in many ways without limiting to this, and the information dot 5 can be arranged in arbitrary direction and arbitrary length, including expressing four bits by arranging in 16 directions.

Further, while, in FIG. 12B, the information dots 5 are arranged at the end points for all virtual reference points 4 defined as the start points, without limiting to this, information may be defined whether or not a dot is arranged on a virtual reference point. For example, if a dot is arranged on a virtual reference point, information can be defined as "1," and if no dot is arranged thereon, "0."

Figure 15:
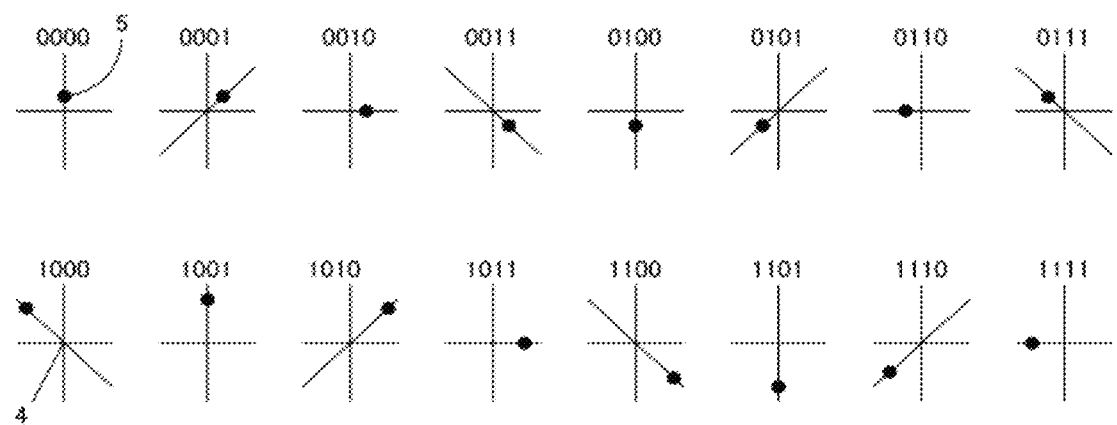
FIG. 15 is a diagram illustrating a stream dot pattern as an example of a dot pattern used in the present invention (5).

FIG. 15 is an example of an information dot and bit expression of data defined therein, and shows another embodiment.

Also, if two kinds of information dots 5, short (the upper row of FIG. 15) and long (the lower row of FIG. 15) from a virtual reference point 4 that is calculated from reference dots 1, are used and vector directions are eight directions, four bits can be expressed. Here, the long one is preferably approximately 25 to 30% of the distance between adjacent virtual reference points 4, and the short one is preferably approximately 15 to 20% thereof. However, the gap between the centers of the long/short information dots 5 is preferably longer than the diameter of these dots.

The information dot 3 is preferably one dot in consideration of the visual quality. However, if visual quality is disregarded and information amount is required to be large, a large amount of information can be acquired by allocating one bit for one vector and expressing the information dot 3 using a plurality of dots. For example, with concentric eight direction vectors, $2^8$ pieces of information can be expressed by the information dot 3 defined based on a reference dot 4, expressing $2^{64}$ pieces of information with eight information dots of sets of certain information.

In this way, the stream dot pattern of the invention is formed on the basis of reference dots that are continuously arranged in a line including a curved line, instead of reference dots that are formed two-dimensionally in a grid in the conventional dot patterns proposed by the inventor.

Figure 16A:
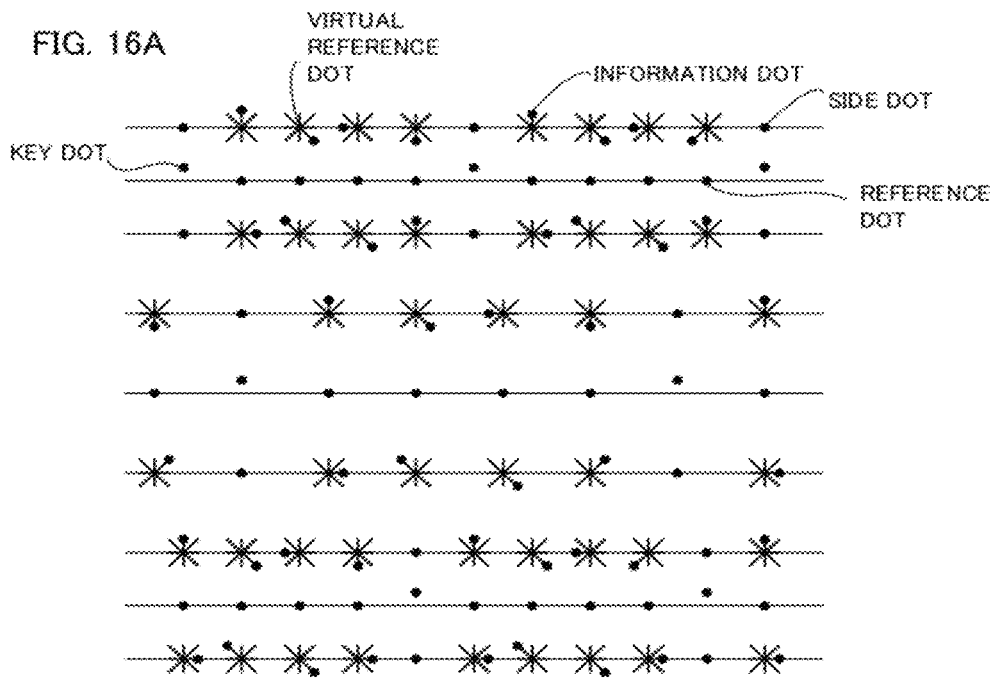
FIGS. 16A and 16B are diagrams illustrating a stream dot pattern as an example of a dot pattern used in the present invention (6).
Figure 16B:
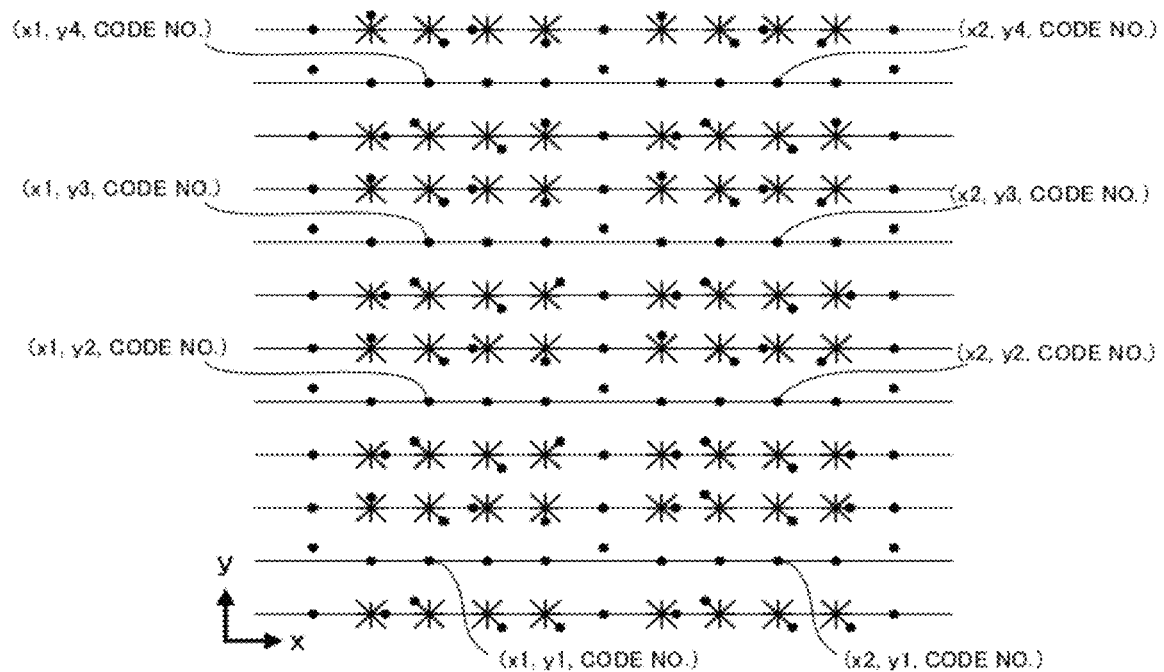

FIGS. 16A and 16B are diagrams showing an example of a state in which stream dot patterns are arranged in an up-to-down direction.

In FIGS. 16A and 16B, key dots and side dots are arranged in addition to the reference dots and information dots. The key dot is a dot arranged at both ends of a set of certain information. This key dot is a representative point of one area of a dot pattern 1 that represents a set of information dots. The side dot is a dot arranged on a positive and negative extension line extending from displacement of the key dot 2.

In FIG. 16B, reference dots and stream dot patterns are arranged with even intervals. As shown in FIG. 16B, X and Y coordinate values are tightly arranged and defined by forming a plurality of stream dot patterns in which intervals of reference points are constant. However, the stream dot pattern of the invention is not limited to this, and, as shown in FIG. 16A, the interval of the dot patterns may be arbitrary set. Also, the interval of the reference dots can be arbitrary set.

In this way, without limiting to the shape of a rectangular area when forming a dot pattern that defines X and Y coordinates as a two-dimensional code (using as an index), the dot pattern can be formed by repeating a set of certain information in a flexible shape tailored to an information area visibly formed on a medium surface.

It should be noted that the virtual reference lines and virtual reference points of the invention are not actually formed by printing on a medium surface, and are only virtually set when arranging a dot pattern on the image memory of a computer or when reading a dot pattern.

Using this stream dot pattern, dot patterns can be formed on curved surface elements such as a globe, or three-dimensional objects such as a human phantom and a three-dimensional map. Thus, the input/output device of the invention can be utilized without limiting to a planar map, a picture book and the like.

INDUSTRIAL APPLICABILITY

The invention can be utilized for any printing medium. Recognition of dot patterns is made possible by detecting only the grid dots, regardless of the optical reading unit that utilizes frequency characteristics and the ink used.

Therefore, recognition of dot patterns is made possible by detecting only the grid dots even when grid dots and halftone dots are printed using the same kind of ink. In this way, recognition of dot patterns is made possible by superimposing and printing the dot patterns and graphics on a printing medium printed even in one color such as one color printing, enabling printing with lower cost. Further, the dot pattern imaged using consumer products, such as a mobile telephone, a digital camera, and a web camera, as the optical reading unit may also be read for determination.

DESCRIPTION OF REFERENCE NUMERALS AND SIGNS

1 Reference Dot
2 First Virtual Reference Line
3 Second Virtual Reference Line
4 Virtual Reference Point
5 Information Dot

What is claimed is:

1. A printing medium comprising:
   grid dots that configure a dot pattern that defines predetermined information according to a predetermined rule and a general graphic; and
   halftone dots that configure the general graphic, wherein the grid dots are configured for being read out by an optical reading unit and are analyzed from read bitmap image data by an image analysis processing unit, and
   wherein the halftone dots and the grid dots are printed on the printing medium with an ink so that the halftone dots and the grid dots can be distinguished from brightness information recorded in the bitmap image data.

2. The printing medium according to claim 1 wherein the ink absorbs infrared light of a predetermined wavelength range.

3. The printing medium according to claim 1 wherein the halftone dots that are adjoiningly printed are printed in predetermined halftone dot density so that an image analysis processing unit can detect each dot of the adjoiningly printed halftone dots without connecting one another.

4. The printing medium according to claim 1 wherein
   when the grid dots are rectangular shaped or elliptical arc shaped and having a shorter side thereof whose length is defined as L, in inches, and print screen ruling of halftone dots is defined as D, in lines per inch:
   if the grid dots are rectangular shaped and the halftone dots are circular shaped, the halftone dots are printed in the predetermined halftone dot density X(%) of less than $25\pi L^2 \times D^2$;
   if the grid dots are rectangular shaped and the halftone dots are square shaped, the halftone dots are printed in the predetermined halftone dot density X(%) of less than $50 L^2 \times D^2$;
   if the grid dots are elliptical arc shape and the halftone dots are circular shaped, the halftone dots are printed in the predetermined halftone dot density X(%) of less than $25\pi^2 L^2 \times D^2/4$; and
   if the grid dots are elliptical arc shaped and the halftone dots are square shaped, the halftone dots are printed in the predetermined halftone dot density X(%) of less than $50\pi L^2 \times D^2/4$.

5. An information processing method, comprising the steps of:
   reading out, using an optical reading unit, a printing medium on which a dot pattern arranged with grid dots in accordance with a predetermined rule for defining predetermined information and a general graphic using halftone dots are superimposed and printed,
   decoding read bitmap image data into the predetermined information,
   detecting dots in accordance with a predetermined method from brightness information recorded in the bitmap image data,
   determining the dots as either the grid dots that constitute the dot pattern or the halftone dots, and
   decoding the dot pattern into the predetermined information.

6. The information processing method according to claim 5, wherein when calculating a number of pixels that constitutes dots that are detected in accordance with a predetermined method from the bitmap image data formed with pixels and determining the dots as either the grid dots or the halftone dots based on whether the number of the pixels is larger or smaller in relation to a preset threshold value, the method further comprises the steps of:
   decoding the dot pattern into predetermined information by determining the dots as the halftone dots if the number of the pixels constituting the dots is smaller than the threshold value, or
   determining the dots as the grid dots if the number of the pixels constituting the dots is larger than the threshold value.

7. The information processing method according to claim 5, wherein an image analysis processing unit comprises a threshold table or a predetermined calculation formula, the method further comprising the steps of:
   detecting a pixel value that indicates brightness information excluding the dots within a predetermined area of the read bitmap image data,
   calculating a threshold value corresponding to the pixel value from the threshold table or the predetermined calculation formula, and
   determining grid dots.

8. The information processing method according to claim 7, wherein the image analysis processing unit comprises:
   a first threshold table or predetermined calculation formula for determining the halftone dots and the grid dots; and
   a second threshold table or predetermined calculation formula for determining grid dots, at least excluding halftone dots, that are read out by an optical reading unit, the image analysis processing performing the steps of:
   calculating a threshold value corresponding to the pixel value by selecting either thereof by a predetermined method, and
   determining grid dots.

9. The information processing method according to claim 6, wherein the printing medium is printed with the grid dots and the halftone dots using a same ink.

10. The information processing method according to claim 6, wherein
    the printing medium is printed with the grid dots and the halftone dots using an ink that absorbs infrared light of a predetermined wavelength range,
    the optical reading unit comprises a filter that blocks at least visible light and an infrared irradiation unit that irradiates infrared light at least within the predetermined wavelength range, and
    the optical reading unit reads out the printing medium printed with an ink that absorbs infrared light of the predetermined wavelength range.

11. The information processing method according to claim 6, wherein after an optical reading unit reads out a printing medium printed with the halftone dots in predetermined halftone dot density so that the halftone dots that are adjoiningly printed do not connect to one another, the method further comprises the steps of:
- detecting each dot from read bitmap image data so that the halftone dots do not connect to one another,
- determining the dot as either the grid dot or the halftone dot, and
- decoding the dot pattern into predetermined information.

12. The information processing method according to claim 11, wherein when the grid dots are a rectangular shape or an elliptic arc shape and a length of a shorter side thereof is defined as L (inch), and print screen ruling of halftone dots is D (lpi):
- if the grid dots are a rectangular shape and a shape of the halftone dots is a circle, the halftone dots are printed in the predetermined halftone dot density X(%) of less than $25\pi L^2 \times D^2$;
- if the grid dots are a rectangular shape and the shape of the halftone dots is a square, the halftone dots are printed in the predetermined halftone dot density X(%) of less than $50L^2 \times D^2$;
- if the grid dots are an elliptic arc shape and a shape of the halftone dots is a circle, the halftone dots are printed in the predetermined halftone dot density X(%) of less than $25\pi^2 L^2 \times D^2/4$; and
- if the grid dots are an elliptic arc shape and the shape of the halftone dots is a square, the halftone dots are printed in the predetermined halftone dot density X(%) of less than $50\pi L2 \times D^2/4$.

13. The information processing method according to claim 5, wherein, when a pixel value that indicates brightness information recorded in the bitmap image data formed with pixels is equal to or less than a predetermined threshold value, the method further comprises the steps of:
- detecting the pixels as dots,
- determining the dots as either the grid dots or the halftone dots, and
- decoding the dot pattern into predetermined information.

14. The information processing method according to claim 5, wherein an image analysis processing unit, in all pixels of each row of the bitmap image data formed with pixels, performs the steps of:
- detecting respective pixel values that indicate brightness information recorded in a first pixel and a second pixel that is arranged in a horizontal direction from the first pixel and apart from the first pixel by a predetermined number of pixels,
- detecting a smaller one of the pixel values as a dot when an absolute value of a difference of both pixel values is equal to or more than a predetermined threshold value,
- determining the dots as either grid dots or the halftone dots, and
- decoding the dot pattern into predetermined information when the dots are the grid dots.

15. The information processing method according to claim 13, wherein the predetermined threshold value is obtained by performing the steps of:
- detecting a pixel value that indicates brightness information excluding the dots within a predetermined area of the bitmap image data, and
- calculating using a threshold table or a predetermined calculation formula corresponding to the pixel value.

16. The information processing method according to claim 13, wherein the predetermined threshold value is obtained for each row by performing the steps of:
- detecting a pixel value that indicates brightness information excluding the dots within a predetermined area in a middle of each row in each row of the bitmap image data, and
- calculating using a threshold table or a predetermined calculation formula corresponding to the pixel value.

17. The information processing method according to claim 5, wherein the dot pattern is formed by arranging one line or a plurality lines of stream dot patterns arranged in accordance with the steps of:
- continuously disposing a plurality of reference dots so as to form a line in accordance with a predetermined rule;
- providing a first virtual reference line that comprises a straight line, a polygonal line and/or a curved line that connects the plurality of reference dots;
- providing at least one second virtual reference line that is defined at a predetermined position from the reference dots and/or the first virtual reference line and comprises a straight line and/or a curved line;
- providing a plurality of virtual reference points at predetermined positions on the second virtual reference line; and
- disposing an information dot that defines X and Y coordinate values and/or a code value by a distance and a direction from the virtual reference point, at an end point of a vector expressed with the virtual reference point as a start point.

18. The information processing method according to claim 17, wherein the stream dot is further provided with a reference dot, at a predetermined position, that is a reference for defining the second virtual reference line and/or defining a direction of the dot pattern and a pair of X and Y coordinate values and/or a code value.

19. An information processing device that reads out a printing medium, on which a dot pattern in which grid dots are arranged in accordance with a predetermined rule for defining predetermined information and a general graphic printed with halftone dots are superimposed and printed, by an optical reading unit, and decodes the dot pattern constituted by the grid dots into the predetermined information from read bitmap image data by an image analysis processing unit,
- wherein the image analysis processing unit detects dots from brightness information recorded in the bitmap image data in accordance with a predetermined method, determines the dots as either the grid dots that constitute the dot pattern or the halftone dots, and decodes into the predetermined information when the dots are the grid dots.

20. The information processing device according to claim 19, wherein when calculating a number of pixels that constitutes dots detected in accordance with a predetermined method from the bitmap image data formed with pixels and determining the dots as either the grid dots or the halftone dots based on whether the number of pixels is smaller or larger in relation to a preset threshold value,
- the image analysis processing unit decodes into predetermined information by determining the dots as the halftone dots when the number of the pixels constituting the dots is smaller than the threshold value, or
- determining the dots as the grid dots when the number of the pixels constituting the dots is larger than the threshold value.

21. The information processing device according to claim 19 wherein
- the printing medium is printed with the grid dots and the halftone dots using an ink that absorbs infrared light of a predetermined wavelength range, and the optical reading unit comprises: a filter that blocks at least visible light; and an infrared irradiation unit that irradiates infrared light of at least within the predetermined wavelength range.

* * * * *